United States Patent
Smith et al.

(10) Patent No.: US 11,401,132 B2
(45) Date of Patent: Aug. 2, 2022

(54) RETRACTABLE CORD MANAGEMENT SYSTEM

(71) Applicant: Kohler Co., Kohler, WI (US)

(72) Inventors: Andrew L. Smith, Sheboygan, WI (US); Billy Jack Ahola, Manitowoc, WI (US); Alexander V. LeTourneau, Sheboygan, WI (US); Scott R. Krebs, Sheboygan Falls, WI (US); Lawrence E. Duwell, Adell, WI (US); Donald G. Bogenschuetz, Sheboygan, WI (US); Peter William Swart, Oostburg, WI (US)

(73) Assignee: Kohler Co., Kohler, WI (US)

(*) Notice: Subject to any disclaimer, the term of this patent is extended or adjusted under 35 U.S.C. 154(b) by 0 days.

(21) Appl. No.: 16/653,392

(22) Filed: Oct. 15, 2019

(65) Prior Publication Data
US 2020/0130982 A1     Apr. 30, 2020

Related U.S. Application Data

(60) Provisional application No. 62/753,505, filed on Oct. 31, 2018.

(51) Int. Cl.
*A47B 81/00* (2006.01)
*B65H 75/34* (2006.01)
*H02G 11/00* (2006.01)

(52) U.S. Cl.
CPC ............ *B65H 75/34* (2013.01); *A47B 81/00* (2013.01); *H02G 11/003* (2013.01); *B65H 2701/34* (2013.01)

(58) Field of Classification Search
CPC .... B65H 75/34; B65H 2701/34; A47B 81/00; H02G 11/003
(Continued)

(56) References Cited

U.S. PATENT DOCUMENTS

| | | | | |
|---|---|---|---|---|
| 1,557,033 A | * | 10/1925 | Davis | B60S 5/04 |
| | | | | 242/388.9 |
| 1,969,749 A | * | 8/1934 | Harsh | E05C 19/04 |
| | | | | 292/73 |

(Continued)

FOREIGN PATENT DOCUMENTS

| CN | 1269704 A | 10/2000 |
|---|---|---|
| CN | 2629634 Y | 8/2004 |

(Continued)

OTHER PUBLICATIONS

Chinese Office Action for Chinese Application No. 201911044213.3 dated Apr. 22, 2021.

(Continued)

*Primary Examiner* — Daniel J Troy
*Assistant Examiner* — Timothy M Ayres
(74) *Attorney, Agent, or Firm* — Lempia Summerfield Katz LLC

(57) ABSTRACT

A cord management system for a cabinet or other similar furniture, appliances, or other applications include a conduit. A cord management weight is disposed within the conduit. The cord management weight includes a cord receiving portion and a weight locking feature. The cord receiving portion is configured to receive a portion of an electrical cord of an electronic device. The weight locking feature is configured to selectively prevent translational movement of the cord management weight within the conduit. The cord management weight is configured to be selectively retracted into the conduit and locked into position within the conduit.

15 Claims, 16 Drawing Sheets

(58) Field of Classification Search
USPC .......................................... 312/223.6, 319.4
See application file for complete search history.

(56) References Cited

U.S. PATENT DOCUMENTS

| | | | | |
|---|---|---|---|---|
| 2,214,759 | A * | 9/1940 | Bosch, Jr. ............... | H04M 1/15 |
| | | | | 242/388.9 |
| 2,730,423 | A * | 1/1956 | Mock .................... | A47B 88/57 |
| | | | | 312/334.22 |
| 2,890,480 | A * | 6/1959 | Gregg ................. | E05D 13/1269 |
| | | | | 16/197 |
| 3,441,978 | A * | 5/1969 | James ................. | E05D 13/1207 |
| | | | | 16/197 |
| 3,885,844 | A | 5/1975 | Schneider | |
| 4,042,184 | A * | 8/1977 | Langenohl ........... | B65H 75/368 |
| | | | | 242/388.9 |
| 4,275,940 | A * | 6/1981 | Draper .................. | A61G 15/14 |
| | | | | 108/137 |
| 5,257,746 | A * | 11/1993 | Norrvi .................. | B65H 75/34 |
| | | | | 242/386 |
| 5,379,903 | A * | 1/1995 | Smith .................... | A45D 44/02 |
| | | | | 132/289 |
| 5,577,819 | A | 11/1996 | Olsen | |
| 5,671,988 | A * | 9/1997 | O'Neill ............... | A47B 88/467 |
| | | | | 312/333 |
| 5,917,964 | A | 6/1999 | Denny | |
| 6,089,685 | A | 7/2000 | Ryan et al. | |
| 6,095,156 | A | 8/2000 | Smith, II | |
| 6,305,388 | B1 | 10/2001 | Zeller | |
| 6,591,952 | B1 | 7/2003 | Randall | |
| 6,969,275 | B1 * | 11/2005 | Brock ................... | H01R 13/60 |
| | | | | 439/502 |
| 7,731,313 | B2 * | 6/2010 | Chen ................... | H04M 1/0237 |
| | | | | 312/334.1 |
| 7,959,240 | B2 | 6/2011 | Smith | |
| 8,180,076 | B2 | 5/2012 | Bastyr et al. | |
| 8,810,076 | B2 * | 8/2014 | Levi ...................... | A45D 20/14 |
| | | | | 191/12.4 |
| 8,870,307 | B1 * | 10/2014 | Provenzano ........... | A45D 44/02 |
| | | | | 312/209 |
| 9,578,963 | B2 | 2/2017 | Mayer | |
| 9,644,834 | B2 | 5/2017 | Cano et al. | |
| 9,675,172 | B2 | 6/2017 | Pandorf et al. | |
| 10,137,990 | B2 * | 11/2018 | Lee .................... | B64D 11/0638 |
| 2006/0006772 | A1 | 1/2006 | Galindo et al. | |
| 2007/0120451 | A1 | 5/2007 | Lamar | |
| 2009/0015117 | A1 * | 1/2009 | Komata ................ | A47B 81/00 |
| | | | | 312/223.6 |
| 2014/0252924 | A1 | 9/2014 | Miller | |
| 2016/0229664 | A1 | 8/2016 | Savchenko | |
| 2017/0099945 | A1 | 4/2017 | Meads | |

FOREIGN PATENT DOCUMENTS

| | | |
|---|---|---|
| CN | 1799484 A | 7/2006 |
| CN | 104386537 A | 3/2015 |
| CN | 204720881 U | 10/2015 |
| CN | 107895866 A | 4/2018 |
| CN | 108199223 A | 6/2018 |
| CN | 207632272 U | 7/2018 |
| CN | 207633317 U | 7/2018 |
| CN | 207687151 U | 8/2018 |
| CN | 207964430 U | 10/2018 |
| DE | 102017111855 A1 | 12/2017 |
| GB | 530147 | 12/1940 |
| JP | 2008136736 | 6/2008 |
| KR | 20040074574 | 8/2004 |
| KR | 101509661 | 1/2015 |

OTHER PUBLICATIONS

Second Office Action in Chinese Patent Application No. 201911044213.3, dated Nov. 19, 2021, 12 pages (including English translation).
Office Action in Chinese Patent Application No. 201911044213 3, dated Apr. 2, 2022, 18 pages (including English translation).

* cited by examiner

RETRACTABLE CORD MANAGEMENT SYSTEM

CROSS-REFERENCE TO RELATED APPLICATIONS

This application claims the benefit of and priority to U.S. Provisional Application No. 62/753,505, filed on Oct. 31, 2018, the entire disclosure of which is hereby incorporated by reference in its entirety.

BACKGROUND

The present disclosure relates generally to cord management systems. More specifically, the present disclosure relates to retractable cord management systems in cabinets, vanities, or other furniture.

Generally speaking, living spaces, such as homes, hotels, etc., can include cabinets, vanities, or other storage areas located in, for example, a bathing environment. Various electric grooming devices, such as blow dryers, curlers, electric toothbrushes, razors, or the like, may be stored in these storage areas. The electric grooming devices may be plugged into an electrical outlet on a wall adjacent the storage area while in use, and may be unplugged and stowed in one of the storage areas when not in use. However, when the electric grooming devices are unplugged and stowed away, the electric cords may get tangled, and/or the storage area may generally appear cluttered.

SUMMARY

At least one embodiment relates to a cord management system. The cord management system can include a conduit. The cord management system can include a cord management weight disposed within the conduit. The cord management weight can include a cord receiving portion and a weight locking feature. The cord receiving portion can be configured to receive a portion of an electrical cord of an electronic device. The weight locking feature can be configured to selectively prevent translational movement of the cord management weight within the conduit. The cord management weight can be configured to be selectively retracted into the conduit and locked into position within the conduit.

Another embodiment relates to a cabinet. The cabinet can include a rack configured to support an electronic device. The cabinet can include an electrical outlet configured to provide electrical power to the electronic device. The cabinet can include a conduit having an opening at an end of the conduit nearest to the electrical outlet. The cabinet can include a cord management weight disposed within the conduit. The cord management weight can have a cord receiving portion configured to receive a portion of an electrical cord of the electronic device. The cord management weight can include a weight locking feature configured to selectively prevent translational movement of the cord management weight within the conduit. The electrical cord can be selectively retracted into the conduit via the cord management weight.

Another embodiment relates to a locking system for a cord management weight. The locking system can include a conduit locking feature operatively coupled to a conduit that is sized to receive a cord management weight. The locking system can include a weight locking feature operatively coupled to the cord management weight. The conduit locking feature can be configured to be operatively coupled to the weight locking feature as the cord management weight moves within the conduit. The cord management weight can be selectively locked into position within the conduit when the conduit locking feature is operatively coupled to the weight locking feature.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
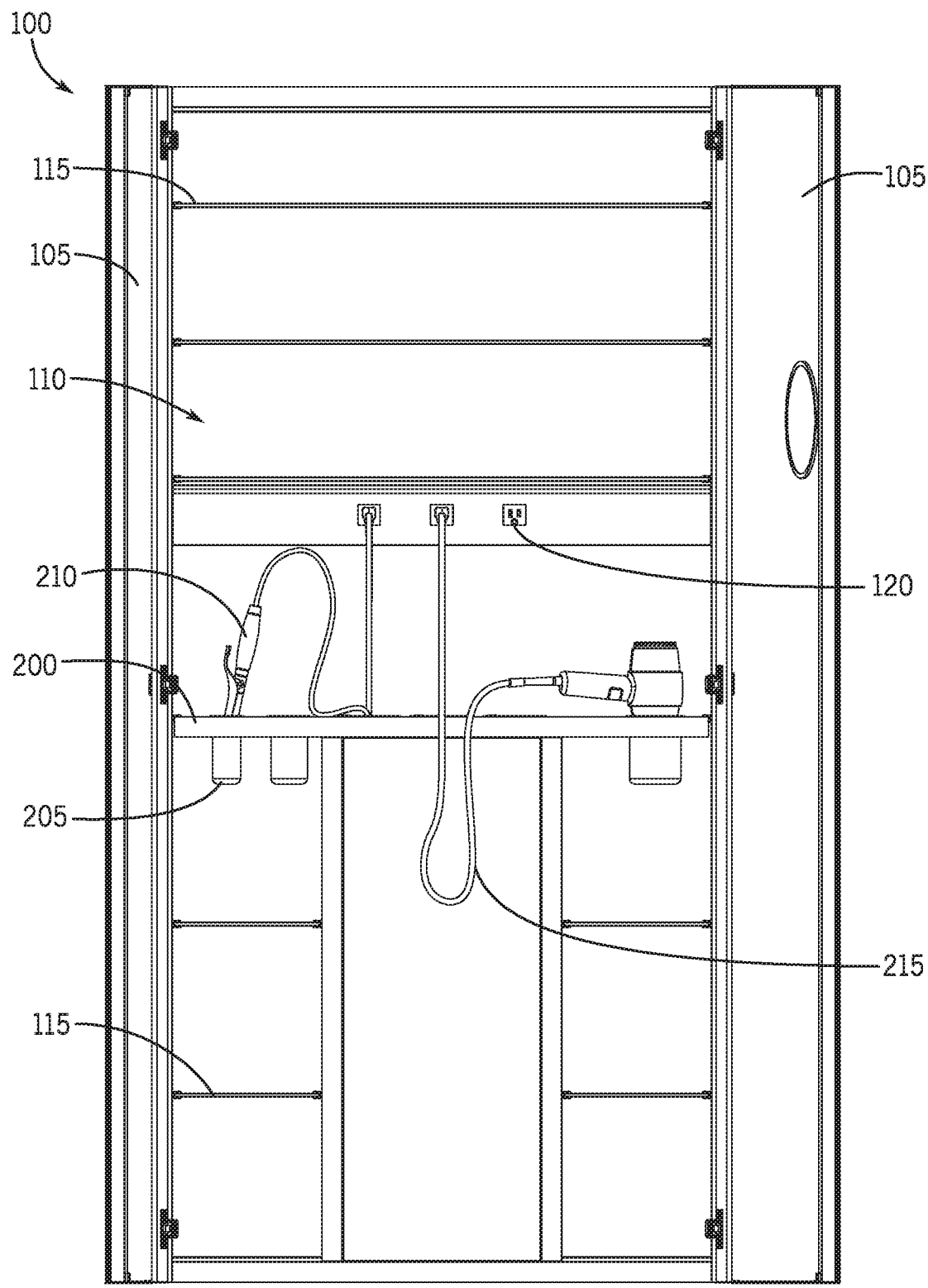
FIG. 1 is a front view of a cabinet having cabinet doors which are opened, according to an exemplary embodiment.

Referring generally to the FIGURES, disclosed herein is a cord management system for use in a cabinet, vanity, or other furniture typically arranged in a home, hotel, or other permanent/temporary living space. The cord management system includes a conduit having an exposed opening. In some embodiments, the cord management system may be integrated in a cabinet, for instance, having electrical outlet(s). The opening may be at an end of the conduit nearest to the electrical outlet(s). The cord management system includes a cord management weight which receives an electrical cord. The cord management weight may be selectively retracted into the conduit, and selectively locked into position within the conduit with the electrical cord. The cord management weight includes a cord receiving portion which receives the electrical cord of an electronic device. The cord management weight may also include a locking portion, which can selectively prevent translational movement of the cord management weight and electrical cord within the conduit.

Various aspects described herein are designed to eliminate (or reduce) clutter caused by electrical cords in, for example, a bathing environment. For instance, the cord management system may provide a simple and effective way to organize a cabinet, vanity, or other furniture, which may use or include the cord management system. A user may couple an electrical cord of an electronic device to the cord receiving portion of the cord management weight. For instance, the electrical cord may be draped around the cord management weight, the electrical cord may be threaded through a hook or hoop, etc. The user may then position the cord management weight in the conduit. The cord management weight (and at least a portion of the electrical cord) may then slide down within the conduit to conceal at least a portion of the electrical cord.

In use, the user may pull on the electronic device to let out the electrical cord from the conduit. The user may lock the cord management weight in a position within the conduit. For instance, in some embodiments, the user may lock the cord management weight at the top of the conduit to provide for substantially full use and extension of the electrical cord. The user may lock the cord management weight at the top of the conduit to prevent inadvertent removal of the cord management weight (and the entire electrical cord) from the conduit. In this manner, the disclosed cord management system can provide an effective way to organize a storage area of a cabinet, vanity, or other furniture, which may include electronic devices including electrical cords.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 2:
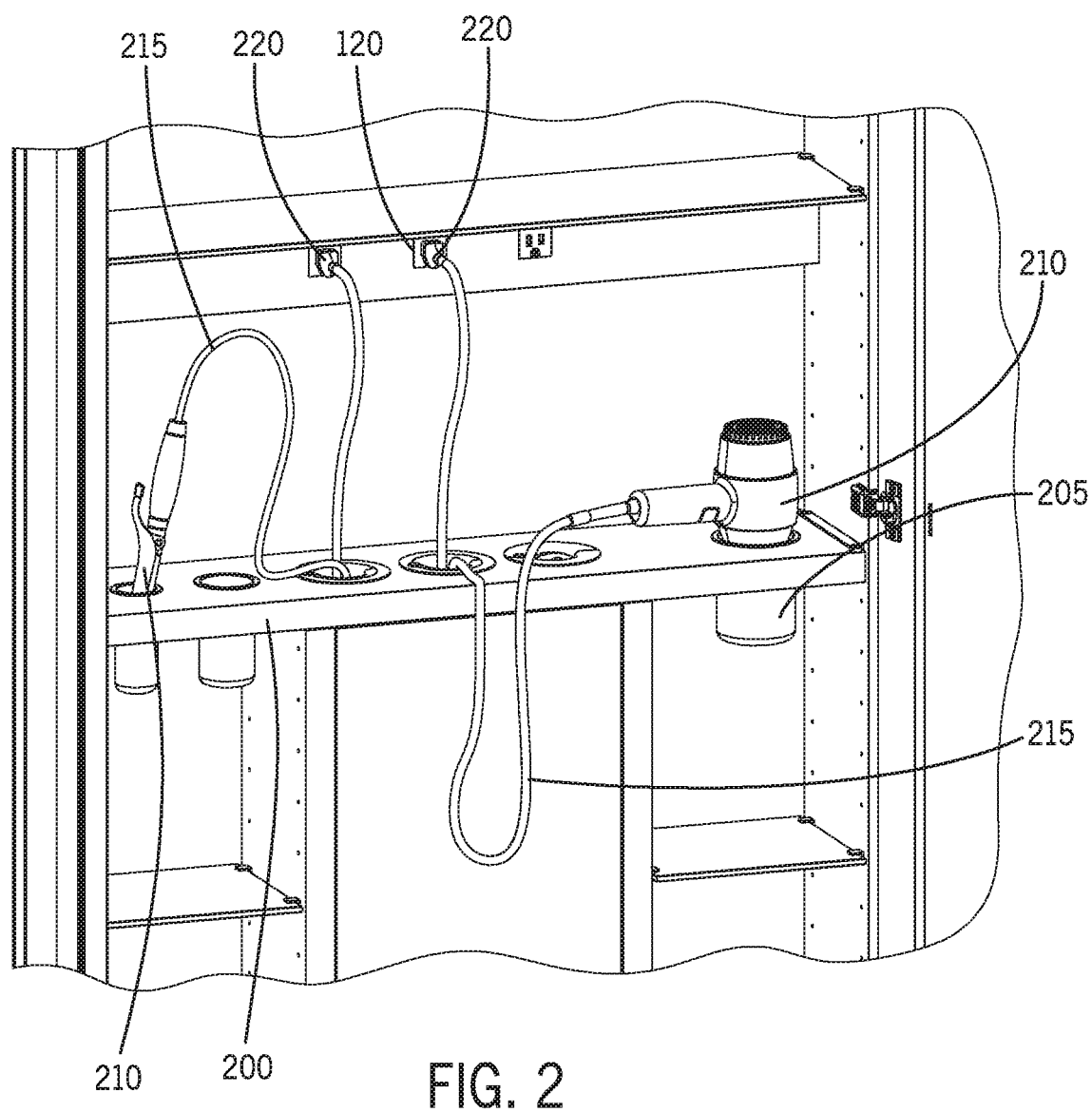
FIG. 2 is a perspective view of a storage rack of the cabinet of FIG. 1, according to an exemplary embodiment.

Referring to FIGS. 1-2, depicted is a view of an open cabinet 100 according to an exemplary embodiment. Specifically, FIG. 1 is a view of the cabinet 100 having cabinet doors 105 which are opened, and FIG. 2 is a view of a storage rack 200 of the cabinet 100. In some embodiments, the cabinet 100 may be arranged in a home, hotel, or other permanent/temporary living space, such as in a bathing environment. The cabinet 100 is shown to be mounted on a wall. In some embodiments, the cabinet 100 may be free-standing. The cabinet 100 is shown to include various surfaces which are mirrored (e.g., the back wall of the cabinet, the inner surfaces of the cabinet doors, etc.). In these embodiments, a user may observe their reflection in one of the mirrored surfaces to, for instance, get ready or dressed.

The cabinet doors 105 selectively cover an internal storage area 110. For instance, the cabinet doors 105 may cover the internal storage area 110 formed by the back wall, side walls, base, and top of the cabinet 100. While the cabinet doors 105 are shown as pivoting between open and closed positions, in some embodiments, the cabinet doors 105 may slide between open and closed positions (e.g., slide vertically, slide horizontally) where the cabinet doors 105 expose or cover the internal storage area 110.

A user may store various items in the internal storage area 110. In some embodiments, the cabinet 100 may include a number of shelves 115. The user may store various items on the shelves 115 of the internal storage area 110, such as grooming products (e.g., deodorant/antiperspirant, lotion, cologne/perfume, etc.), clothing items, etc.

In some instances, some items which are stored in the internal storage area 110 may require electrical power. These items may be selectively plugged into electrical outlets 120, which may be provided in, accessible within, or otherwise situated in the cabinet 100. The items which require electrical power may be plugged into electrical outlets when used, and may be unplugged and stowed in the internal storage area 110 when not in use. The electrical outlets 120 may be electrically coupled to and receive electrical power from a power supply. For example, in some embodiments, the power supply is a wall outlet or jack of a room in which the storage cabinet 100 is coupled. In other embodiments, the power supply includes a battery or battery bank. In each of these embodiments, the power supply may provide electrical power to the electrical outlets 120, which may be used for powering various items which are stored in the internal storage area 110. In some implementations, the electrical outlets 120 may include ground-fault circuit interrupter (GFCI) protection to prevent electrical shock to a user who may be using devices which require electricity (e.g., electronic devices) near a water source such as a sink, shower, or bathtub, for instance.

In some embodiments, the cabinet 100 may include a storage rack 200, which may be located in the internal storage area 110. The storage rack 200 may include various receptacles 205, which are sized to receive various electronic grooming devices 210 (e.g., grooming devices which require electrical power for operation) such as blow dryers, hair curlers or hair straighteners, electric toothbrushes, electric razors, or other types of electronic devices. A user may store the electronic grooming devices 210 in corresponding receptacles 205 within the cabinet 100. The user may store the electronic grooming devices 210 while the electronic grooming devices 210 are plugged in (e.g., electrically coupled to the electrical outlets 120). The user may also store the electrical grooming devices 210 when unplugged (e.g., not electrically coupled to the electrical outlets 120) and, during use, the user may plug the electronic grooming devices 210 into the electrical outlets 120.

In some embodiments, some electrical grooming devices 210 may be wired (e.g., have an electrical cord 215 which extends between the electrical outlet 120 and the electronic grooming device 210 when plugged in). The electrical cord 215 may include a plug 220 which electrically couples the electrical outlet 120 and the electronic grooming device 210 to transmit electrical power to the electrical grooming device 210 (and thereby power the electronic grooming device 210).

The electrical cord 215 may freely drape between the electrical outlet 120 and electronic grooming device 210. Such instances may cause clutter in the cabinet 100, which may not be visually appealing. Additionally, where the electrical cord 215 freely drapes between the electrical outlet 120 and the electronic grooming device 210, the electrical cord 215 may become tangled with itself or other electrical cords 215, which may cause removal and transportation of the electronic grooming device 210 to become difficult and burdensome.

While described herein with reference to a cabinet 100, it should be understood that the disclosed systems and components may be incorporated into, or otherwise included with, other example furniture, such as a vanity, dressers, cupboards, armoires, nightstands, or any other furniture which is typically used in a permanent or temporary living space and may store electronic devices that include cords. Furthermore, while electronic grooming devices 210 are described herein, in some embodiments, other electronic devices may be used in conjunction with the disclosed systems and components. Accordingly, the electronic grooming device 210 described herein is only one example of an electronic device that may be used in conjunction with the disclosed systems and components.

Figure 3:
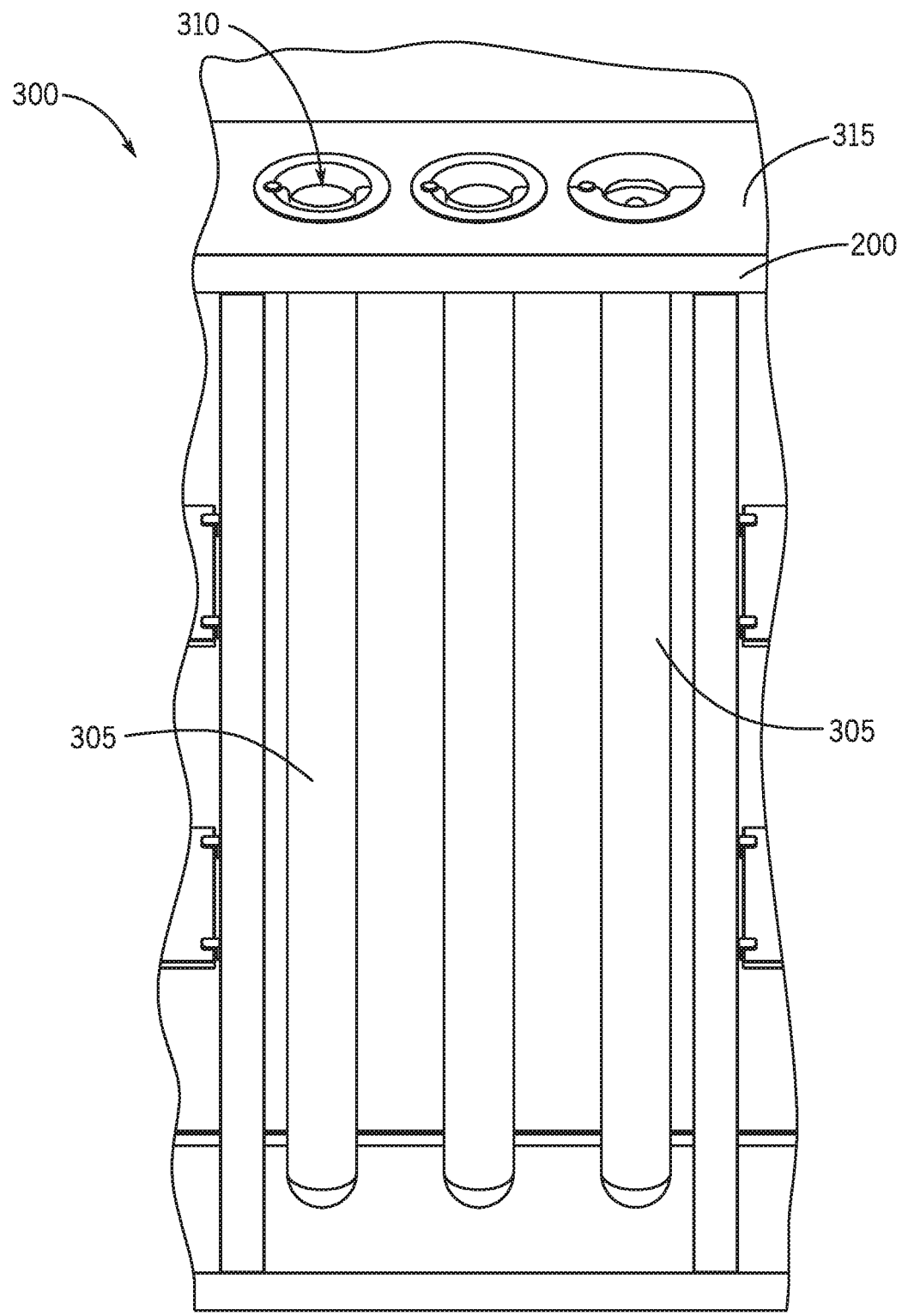
FIG. 3 is a perspective view of a cord management system for the cabinet of FIG. 1, according to an exemplary embodiment.

Referring to FIGS. 2-3, the cabinet 100 may include a cord management system 300. Specifically, FIG. 3 depicts a perspective view of a cord management system 300 for the cabinet 100, according to an exemplary embodiment. The cord management system 300 may be provided in (or be a component of) the storage rack 200. The cord management system 300 may be configured to retain and substantially conceal at least a portion of the electrical cord 215 of the electronic grooming device 210 (or other electronic devices), which may be stored in the storage rack 200.

Figure 4:
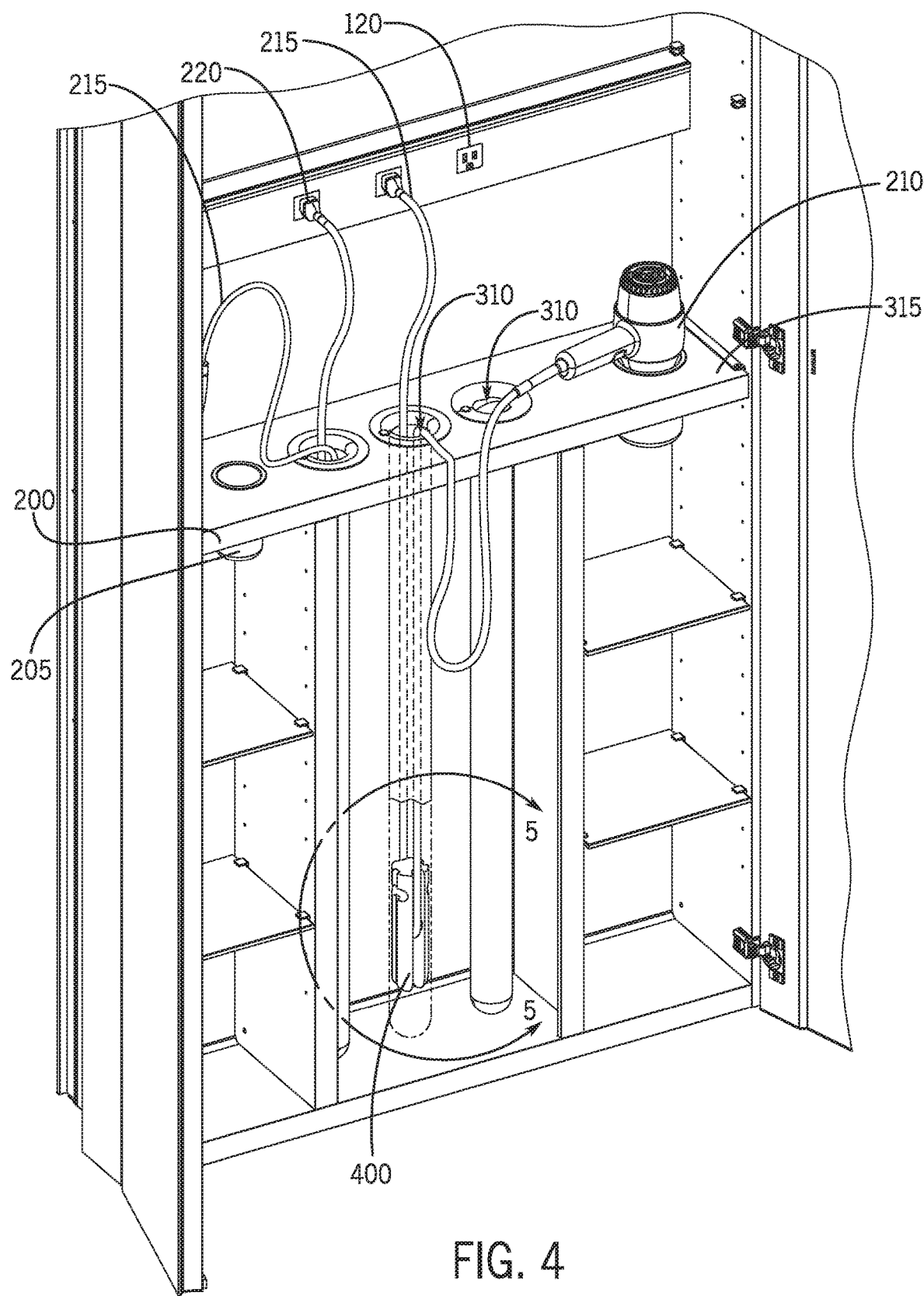
FIG. 4 is another perspective view of the cord management system for the cabinet of FIG. 1.

As can be best seen in FIG. 3, the electrical cord 215 may extend into a conduit 305 of the cord management system 300. The cord management system 300 may include a plurality of conduits 305. While three conduits 305 are shown in FIG. 3, the cord management system 300 may include any number of conduits 305. As shown in FIG. 4, the conduit 305 has an opening 310 in line with an upper surface 315 of the storage rack 200. In some embodiments, the opening 310 may be offset from (but still parallel to) the upper surface 315 of the storage rack 200. The opening 310 may be exposed within the cabinet 100. For instance, the opening 310 may be accessible by a user. The opening 310 may be on a side of the conduit 305 located nearest to the electrical outlet 120. Thus, the electrical cord 215 may extend partially within the conduit 305, and partially out of the conduit 305 with the plug 220 exposed inside the cabinet 100 (or plugged into the electrical outlet 120, as shown in FIG. 2). While the conduit 305 is shown to include one opening 310 at the end adjacent to the storage rack 200, in some embodiments, the conduit 305 may include a second opening at an opposite end.

Referring briefly to FIG. 1 and FIG. 3, in some embodiments, the conduit 305 may extend downwardly from the storage rack 200 within the cabinet 100. The conduit 305 may be located entirely within the cabinet 100. Such embodiments may make incorporation of the cabinet 100 easier to install and more visually appealing, as opposed to instances where the conduits 305 are not self-contained within the cabinet 100. For instance, where the conduit 305 is not self-contained within the cabinet 100, the conduit 305 will require concealment by, for example, a particular mounting arrangement, or by building a concealing structure around the cabinet 100 (e.g., enclosure, cover, etc.). Such instances may make it difficult to incorporate the cabinet 100 into a given room. However, where the conduit(s) 305 are self-contained within the cabinet 100, the cabinet 100 need only be provided power for incorporation into a room. The conduits 305 may be concealed within the cabinet 100 by a panel 125 (or other concealing structure, such as a door, mirror, frosted glass, etc.).

Figure 5:
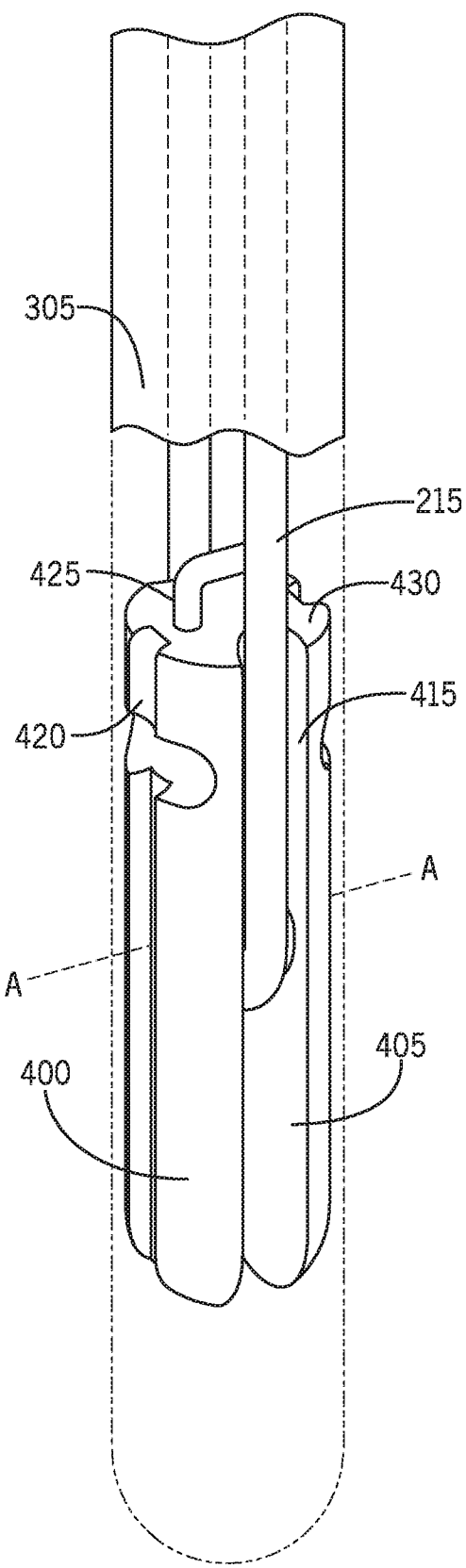
FIG. 5 is a partial detail view of the cord management system of FIG. 4.
Figure 6:
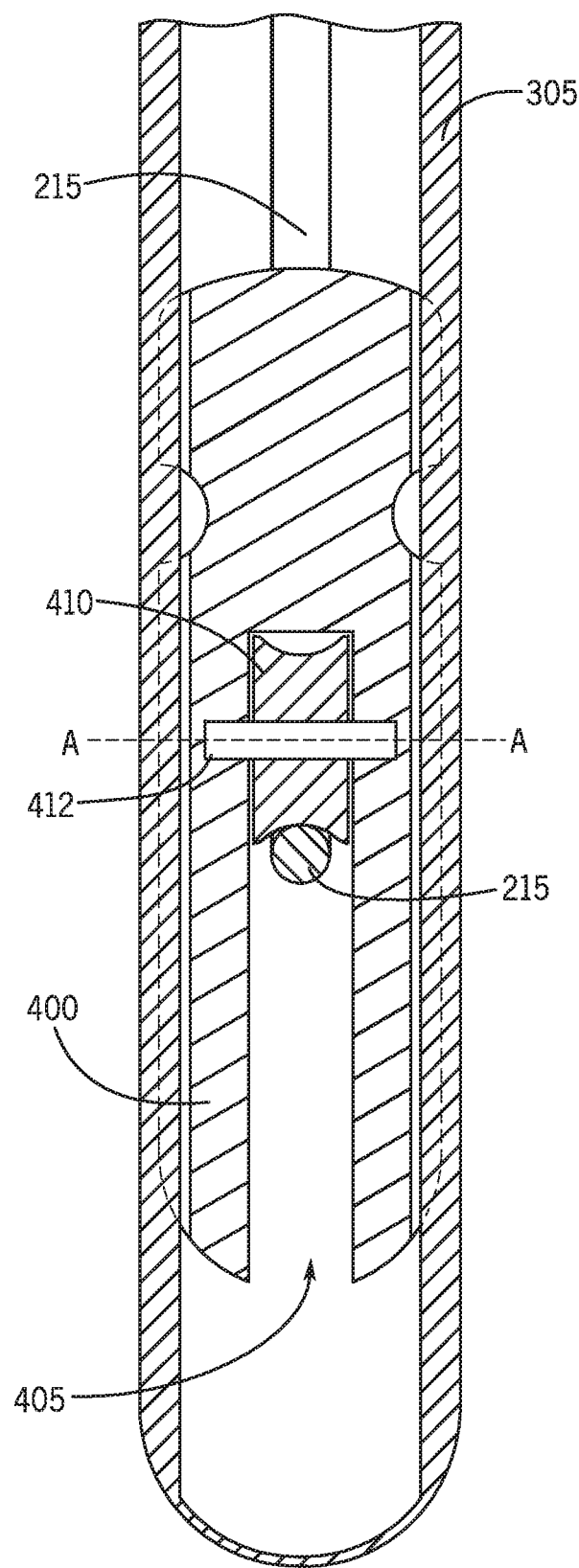
FIG. 6 is a partial cross-sectional view taken along line A-A in FIG. 5.

Referring now to FIGS. 4-6, depicted are views of the cord management system 300 including a cord management weight 400, according to an exemplary embodiment. The cord management weight 400 is shown to include a cord receiving portion 405 configured to receive a portion of the electrical cord 215 of the electronic device 210. The cord receiving portion 405 may be a longitudinal slot extending along the length of the cord management weight 400, as shown in FIG. 5. In some embodiments, the cord receiving portion 405 may be a passage which extends through the cord management weight 400 (e.g., such that the cord management weight 400 includes an aperture extending therethrough). The electrical cord 215 may extend along the cord receiving portion 405. For instance, the electrical cord 215 may be draped around the cord receiving portion 405, inserted through the cord receiving portion 405, etc. The cord management weight 400 may be weighted such that, as the cord management weight 400 is positioned in the conduit 305 with the electrical cord 215 located within or around the cord receiving portion 405, the cord management weight 400 may apply a biasing force to the electrical cord 215, such that a portion of the electrical cord 215 is pulled down into the conduit 305.

In some embodiments, the cord management weight 400 may include a pulley 410. The pulley 410 may be located adjacent to the cord receiving portion 405 such that the electrical cord 215 at least partially contacts the pulley 410 when located within the cord receiving portion 405. The pulley 410 may be retained within the cord management weight 400 via a pin 412 extending through the pulley 410 and coupled to opposite sides of the cord management weight 400. The pulley 410 may rotate about a horizontal axis "A" defined by the pin 412. A user may wrap the electrical cord 215 around the pulley 410 such that the electrical cord 215 can move freely within the conduit 305 as needed. The pulley 410 may rotate as the electrical cord 215 and cord management weight 400 are drawn into and out of the conduit 305, thus eliminating or mitigating friction and potential damage to the electrical cord 215.

The cord management weight 400 may include cord slots 415 extending along the length of the cord management weight 400. The cord slots 415 may be located on opposite sides of the cord management weight 400. The cord slots 415 are shown to extend along the direction of rotation of the pulley 410 (e.g., extending parallel to the pulley 410). The cord slots 415 may be sized to receive the electrical cord 215. Thus, the electrical cord 215 may be draped around the pulley 410, through the cord receiving portion 405 and along the cord slots 415. The cord slots 415 may maintain a longitudinal position of the electrical cord 215 with respect to the cord management weight 400, and may prevent inadvertent rotation and tangling of the electrical cord 215. Further, the cord slots 415 may provide a position for the electrical cord 215 to minimize space between the cord management weight 400 and the conduit 305, thus limiting the likelihood of tangling of the electrical cord 215.

Figure 8:
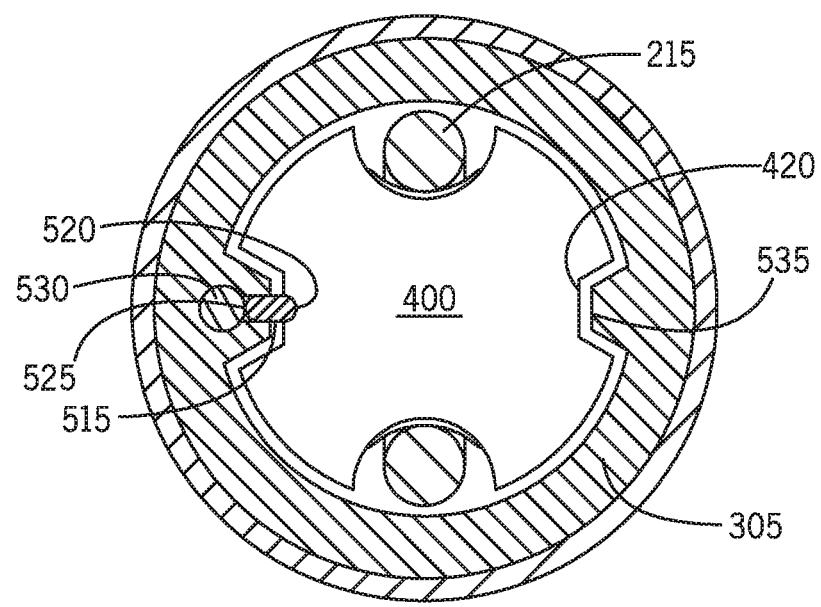
FIG. 8 is a cross-sectional view of the locking system of FIG. 7.

In some embodiments, the cord management weight 400 also includes one or more tracks 420 extending along at least a portion of the length of the cord management weight 400. The track(s) 420 may engage features on the conduit 305, which may prevent rotation of the cord management weight 400 with respect to the conduit 305. While two tracks 420 are shown in FIG. 5, the cord management weight 400 may include any number of tracks 420. Referring briefly to FIG. 8, the conduit 305 may include a railing system 535, which engages the tracks 420 and maintains the relative position of the cord management weight 400 with respect to the conduit 305. The railing system 535 may extend outwardly from the conduit 305 into an interior portion of the conduit 305 and engage the tracks 420. The railing system 535 may be sized to extend into the tracks 420. Hence, as the cord management weight 400 slides up and down the conduit 305, the tracks 420 may slide along the railing system 535.

As the electrical cord 215 is drawn out from the conduit 305 (e.g., by a user pulling on the electronic device 210), the cord management weight 400 may be pulled upwardly within the conduit 305 (e.g., towards the opening 310). The user can thus regulate the amount of slack (e.g., the length of electrical cord 215 between the opening 310 of the conduit 305 and the electronic device 210) by pulling on (or not pulling on) the electronic device 210. The user can pull on the electronic device 210 with a force that is greater than the biasing force of the cord management weight 400 such that the cord management weight 400 moves upwardly within the conduit 305.

In some embodiments, the cord management weight 400 may include a hoop 425. In some embodiments, the hoop 425 may be fixedly coupled to a top 430 of the cord management weight 400. A user may grip the hoop 425 for removing (or inserting) the cord management weight 400 into the conduit 305.

The cord management weight 400 is configured to be locked into position within the conduit 305. For instance, the cord management system 300 may include a locking system including a locking feature corresponding to the conduit 305 (e.g., a conduit locking feature) and a locking feature corresponding to the cord management weight 400 (e.g., a weight locking feature). The conduit locking feature may be arranged near the top of the conduit 305 (e.g., near the opening 310). The locking system may prevent inadvertent removal of the cord management weight 400 from the conduit 305. The conduit locking feature may be selectively coupled with (e.g., either directly, indirectly, or otherwise operatively coupled with) the weight locking feature, and may be selectively decoupled by a user to remove the cord management weight 400 from the conduit 305.

Various embodiments of the locking system for the cord management system 300 will now be described with respect to the following FIGURES. It is noted that the present disclosure is not limited to a particular locking mechanism for the cord management system 300. Rather, the following FIGURES provide several embodiments of the locking system for the cord management system 300. Various aspects depicted in the following embodiments may be substituted, added, modified, etc. within each of the following embodiments.

Generally speaking, the locking system described herein includes a feature on the cord management weight 400 and a corresponding feature on the conduit 305. The feature on the cord management weight 400 may engage (or be engaged by) the corresponding feature on the conduit 305. When engaged, the cord management weight 400 may be locked into position within the conduit 305. A user may manipulate the cord management weight 400 (e.g., by pulling on the cord management weight 400, by rotating the cord management weight 400, by selecting a button or other feature, etc.) to disengage the feature on the cord management weight 400 and the corresponding feature on the conduit 305.

Figure 7:
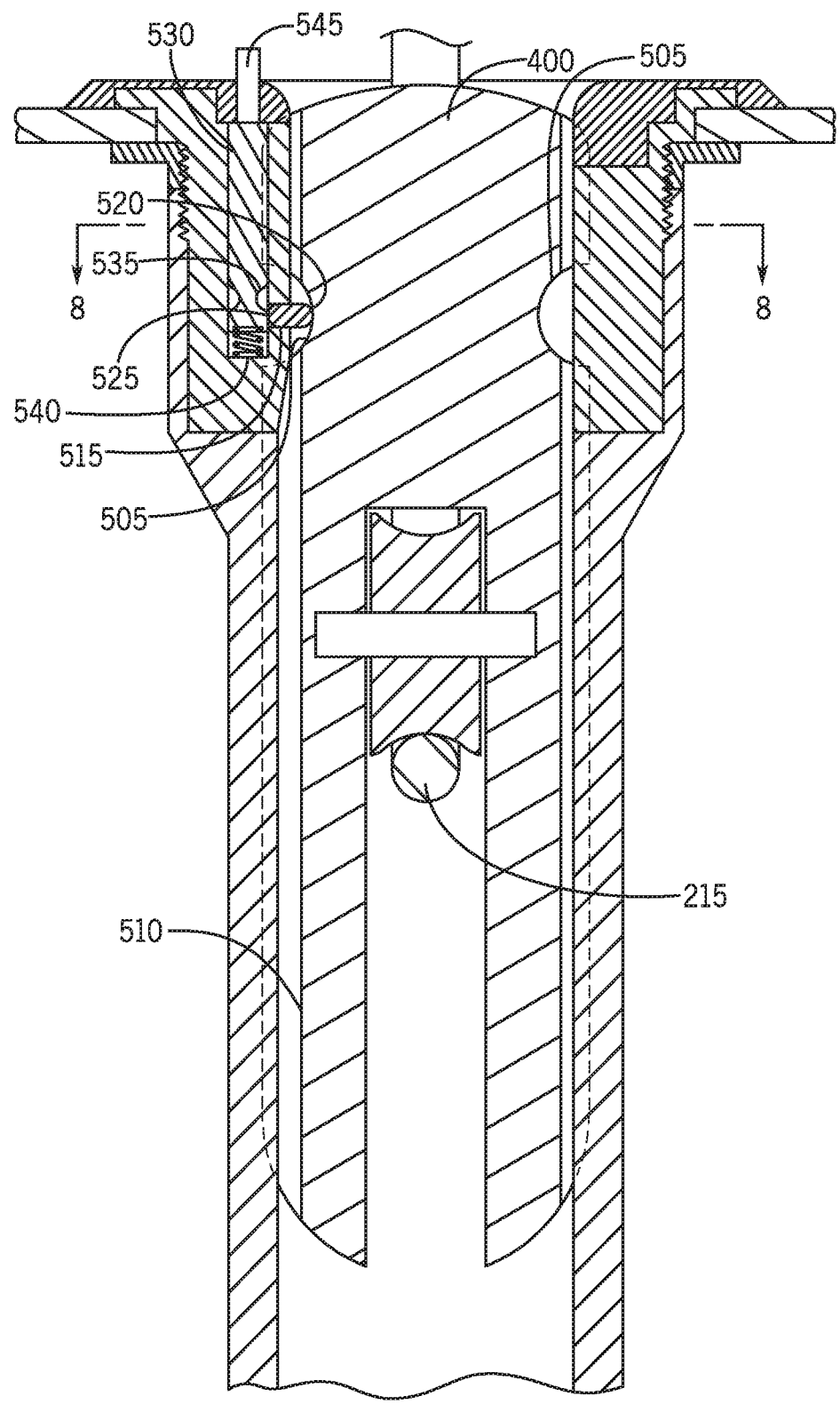
FIG. 7 is a cross-sectional view of a locking system for the cord management system of FIG. 4 including a pin and a release rod.

Referring now to FIGS. 7-8, an exemplary embodiment of a locking system 500 is shown. Specifically, FIG. 7 and FIG. 8 depict views of a locking system 500 for the cord management system 300 including a pin 515 and a release rod 530, according to an exemplary embodiment. The locking system 500 is shown to be located near the top of the conduit 305 (e.g., near the opening 310). The locking system 500 may be located near the top of the conduit 305 to prevent inadvertent removal of the cord management weight 400 from the conduit. However, the locking system 500 may be located anywhere within the conduit 305 including, for instance, near the middle of the conduit 305, towards the bottom of the conduit 305, etc. Further, the cord management system 300 may include a plurality of staged locking systems 500 to lock the cord management weight 400 at various locations or positions within the conduit 305.

The locking system 500 may include a detent 505 located on an exterior surface 510 of the cord management weight 400. The detent 505 may surround the cord management weight 400 (e.g., forming a neck). The detent 500 may extend inwardly from the exterior surface 510 towards a center of the locking mechanism 500. The detent 505 may be semispherical as shown in FIG. 7.

In some embodiments, the cord management weight 400 may be beveled at a juncture between the top of the cord management weight 400 and the detent 505. The bevel may smooth the transition between the detent 505 and the other portions of the cord management weight 400. Such embodiments may provide for engaging and disengaging of the locking system 500 by pulling upwardly on the cord management weight 500, as described in some of the embodiments herein.

The locking system 500 may include a pin 515 configured to engage the detent 505. The pin 515 is shown to include a first and second end 520, 525. The first end 520 may be configured to engage the detent 505 to lock the cord management weight 400 in place. The second end 525 may be configured to engage a release rod 530. The release rod 530 may include a neck 535 (e g, similar to the neck formed on the cord management weight via the detents 505). The release rod 530 may move upwardly and downwardly relative to the conduit 305 via a spring 540. The spring 540 may operate in a manner similar to a spring-loaded pen. For instance, the spring 540 may be retracted (or loaded) by selecting a button 545 at the top of the locking system 500 and released (or unloaded) by selecting the button 545 again.

As the spring releases and retracts, the release rod 530 may move up and down relative to the conduit 305. The pin 515 may slide from an extended position into the conduit 305 and a retracted position where the pin 515 is not located in the conduit 305. When the release rod 530 moves down relative to the conduit 530, the neck 535 may be aligned with and exposed to the pin 515. When the neck 535 is aligned with and exposed to the pin 515, the pin may move freely into the release rod 530, thus allowing the cord management weight 400 to be removed from the conduit 305. When the neck 530 is not exposed to and thus misaligned with respect to the pin 515, release rod 530 may push the pin 515 into the conduit 305, thus forcing to engage the detent 505.

When the detent 505 of the cord management weight 400 is engaged by the pin 515 and the user wishes to remove the cord management weight 400, the user may select the button 545 to load the spring 540, which causes the release rod 530 to move down relative to the pin 515. The release rod 530 may move down such that the neck 535 is aligned with the pin 515. When the neck 535 and pin 515 are aligned, the pin 515 may slide into the neck 535 and thus disengage the detent 505.

Figure 9:
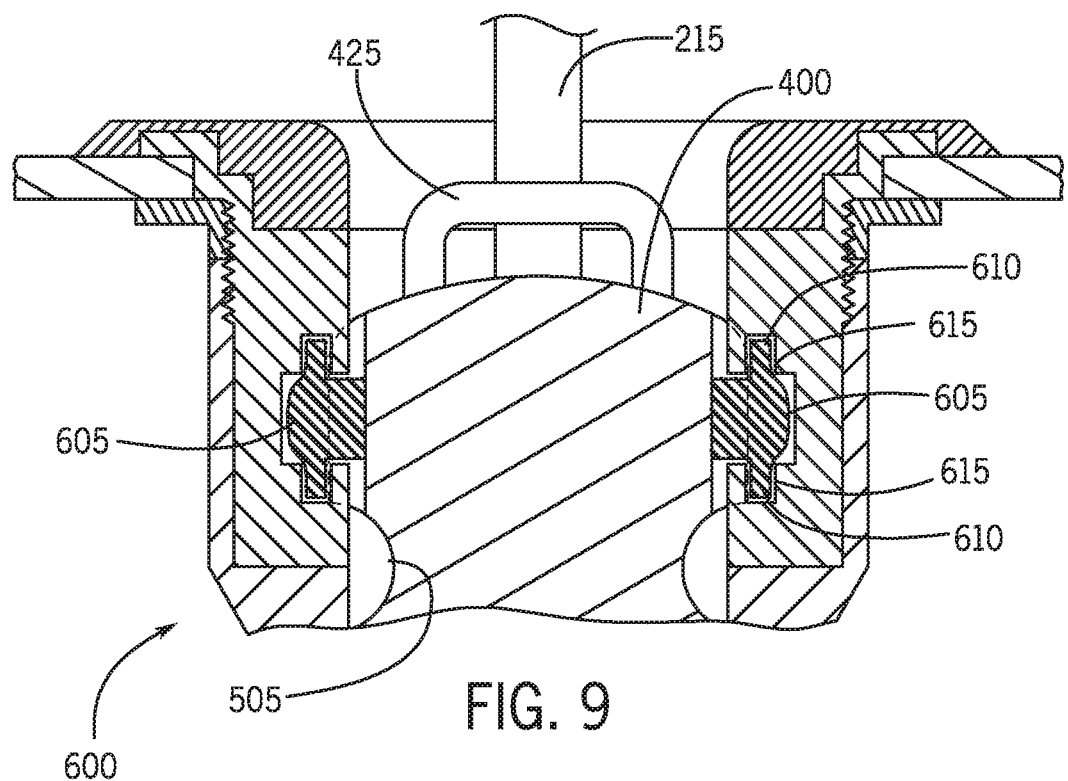
FIG. 9 is a cross-sectional view of a locking system for the cord management system of FIG. 4 including a flex ring in a disengaged position with respect to a cord management weight.
Figure 10:
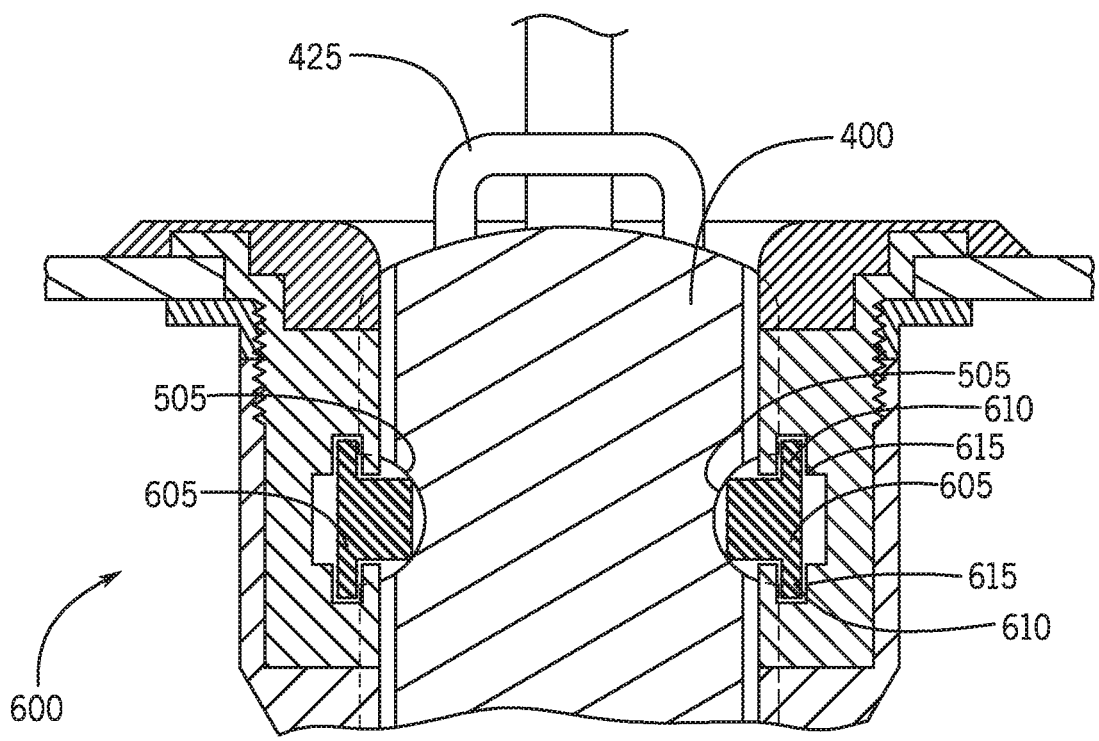
FIG. 10 is a cross-sectional view of the locking system of FIG. 9 including the flex ring in an engaged position with respect to a cord management weight.

Referring now to FIGS. 9-10, another embodiment of a locking system 600 is shown. Specifically, FIGS. 9-10 depict views of a locking system 600 for the cord management system 300 including a flex ring 605, according to an exemplary embodiment. Specifically depicted in FIG. 6, in some embodiments, the locking system 500 may include a flex ring 605, which may be shaped to engage the detent 505. The flex ring 605 may include extensions 610 which extend into corresponding channels 615 formed within the locking system 500 the conduit 305. The flex ring 605 may be oriented such that the flex insert normally extends into the conduit 305. When the cord management weight 400 is inserted into the conduit 305, the user may apply a downward force onto the cord management weight 400. The downward force may cause the flex ring 605 to bow inwardly (e.g., away from the interior channel of the conduit 305). As the flex ring 605 bows inwardly, the flex ring 605 may disengage the detent 505 to thereby permit the cord management weight 400 to slide downwardly into the conduit 305.

In some embodiments, where the hoop 425 is included, the user may grip the hoop 425 for removing (or inserting) the cord management weight 400 into the conduit 305. The user may pull up on the hoop 425 to provide an upward force to the cord management weight 400 to cause the flex ring 605 to bow inwardly, thereby permitting the user to remove the cord management weight 400 from the conduit 305.

Figure 11:
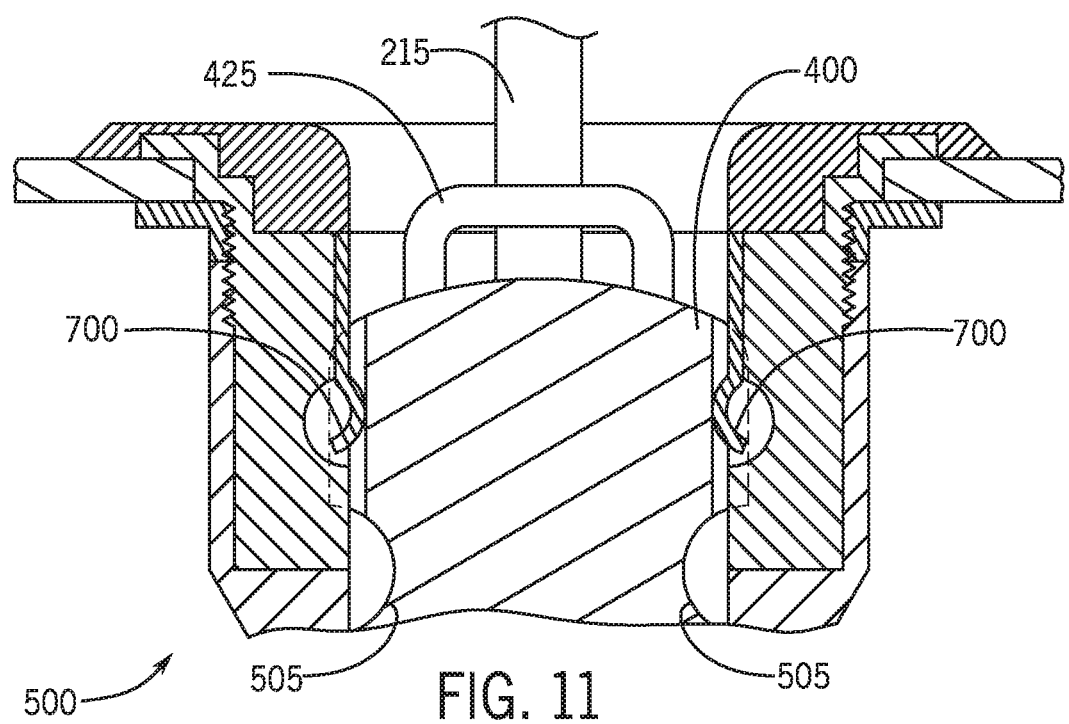
FIG. 11 is a cross-sectional view of a locking system for the cord management system of FIG. 4 including a flex lock in a disengaged position with respect to a cord management weight.
Figure 12:
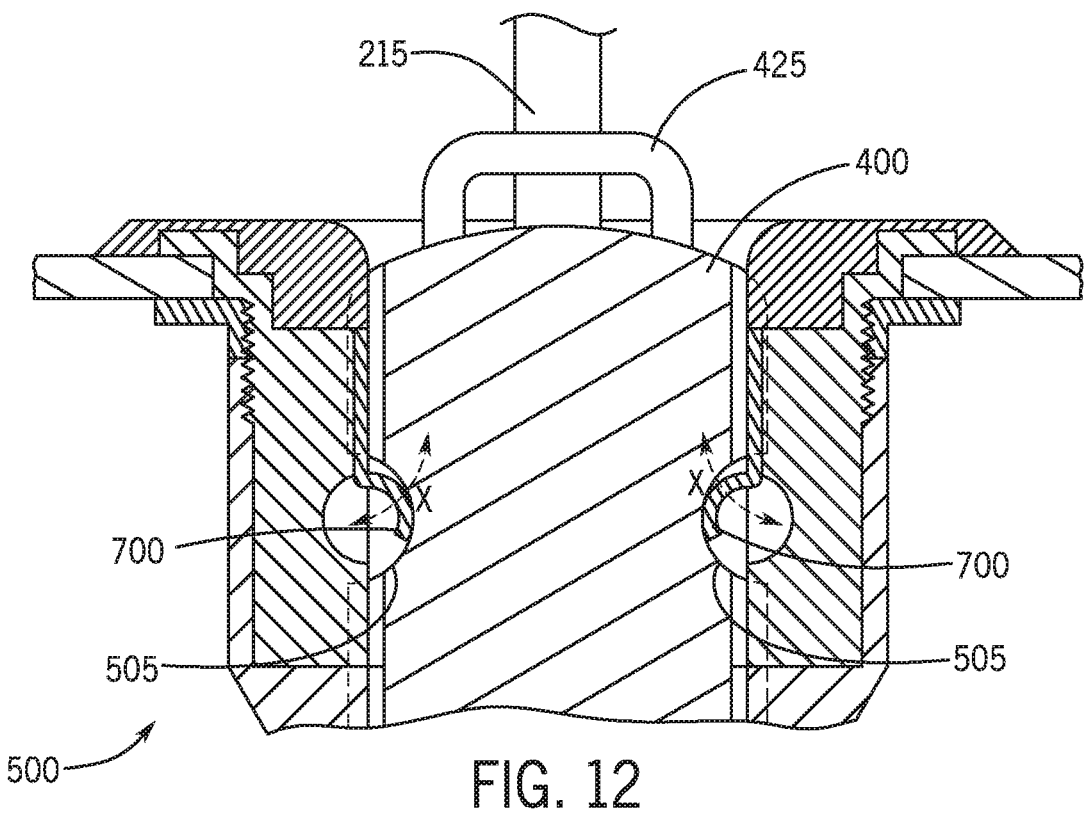
FIG. 12 is a cross-sectional view of the locking system of FIG. 11 including the flex lock in an engaged position with respect to a cord management weight.

Referring now to FIGS. 11-12, another embodiment of a locking system 700 is shown. Specifically, FIGS. 11-12 depict views of a locking system 700 for the cord management system 300 including a flex lock 705, according to an exemplary embodiment. The flex lock 705 may be shaped to engage the detent 505. The flex lock 705 may have a bowed shape, which is (at least partially) complementary to the shape of the detent 505. The flex lock 705 may be constructed of a metal, heavy plastic, or other material which is semi-rigid in nature. The flex lock 705 may be configured to flex outwardly along the arrows X (e.g., towards the interior surface of the conduit 305) as force is provided along the arrows X. Where no force is provided on the flex lock 705, the flex lock 705 may be positioned in the location as shown (e.g., extending into the conduit 305 and thus engaging the cord management weight 400 when the detents 505 are aligned with the flex lock 705). When the user pushes the cord management weight downward (or pulls the cord management weight upward), the flex lock 705 may flex outwardly along the arrows X to thereby permit passage of the cord management weight 400.

In embodiments where the hoop 425 is included, the user may grip the hoop 425 for removing (or inserting) the cord management weight 600 into the conduit 305. The user may pull up on the hoop 425 to provide an upward force to the cord management weight 400 to cause the flex lock 705 to flex outwardly along the arrows "X", thereby permitting the user to remove the cord management weight 400 from the conduit 305.

Figure 13:
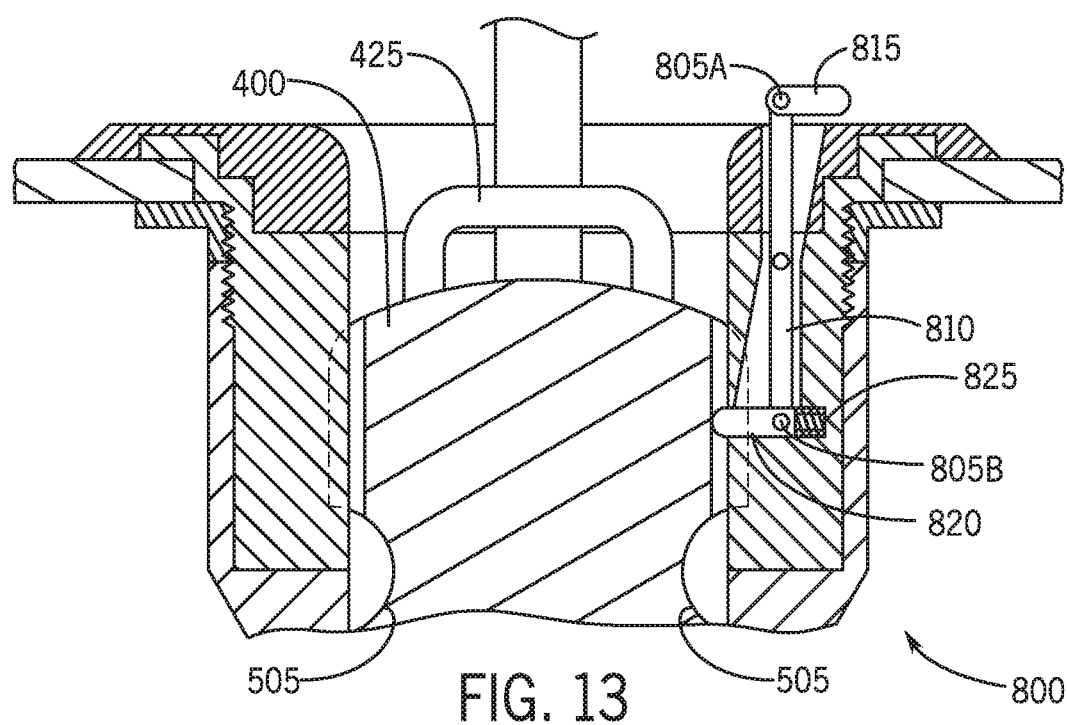
FIG. 13 is a cross-sectional view of a locking system for the cord management system of FIG. 4 including a pin, which is biased by a spring, in a disengaged position with respect to a cord management weight.
Figure 14:
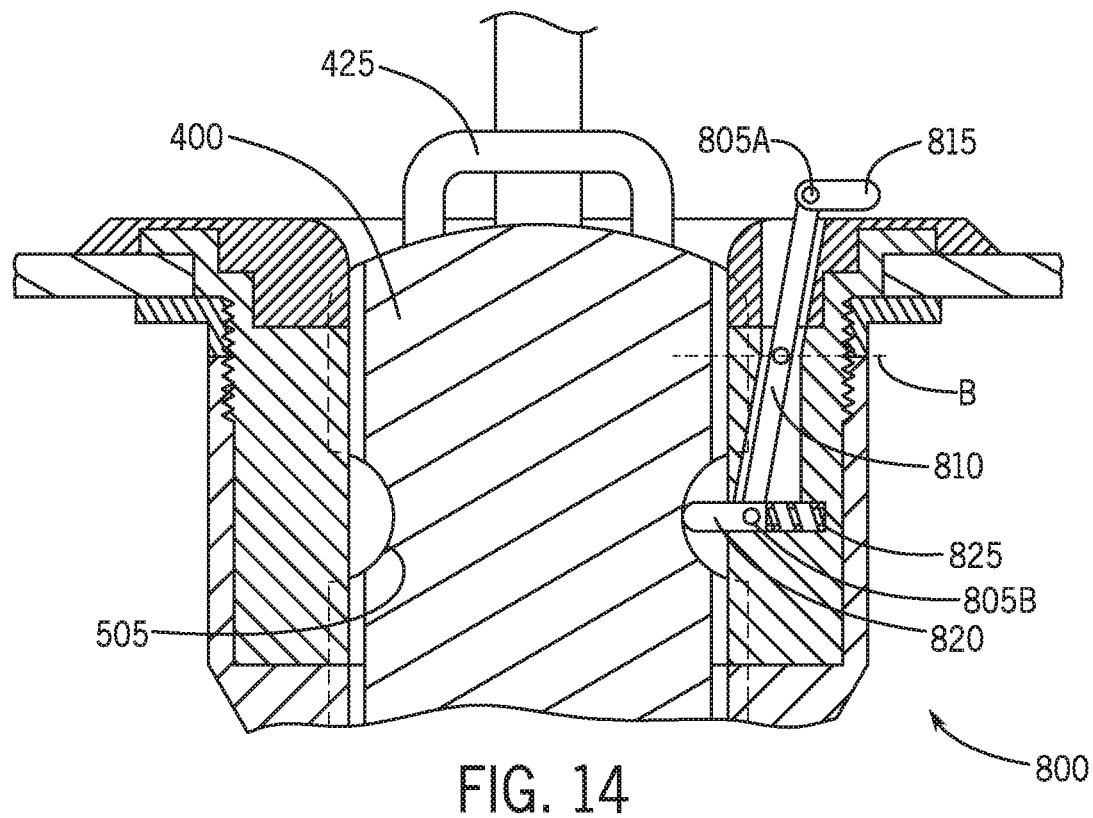
FIG. 14 is a cross-sectional view of the locking system of FIG. 13 including the pin in an engaged position with respect to a cord management weight.
Figure 15:
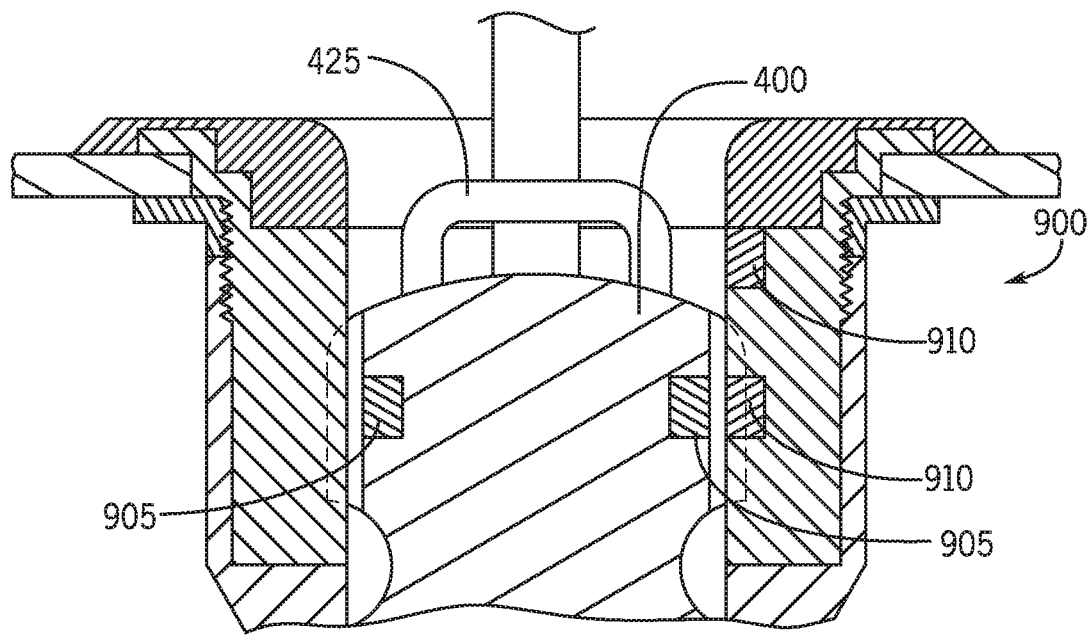
FIG. 15 is a cross-sectional view of a locking system for the cord management system of FIG. 4 including magnets in a disengaged position with respect to a cord management weight.
Figure 16:
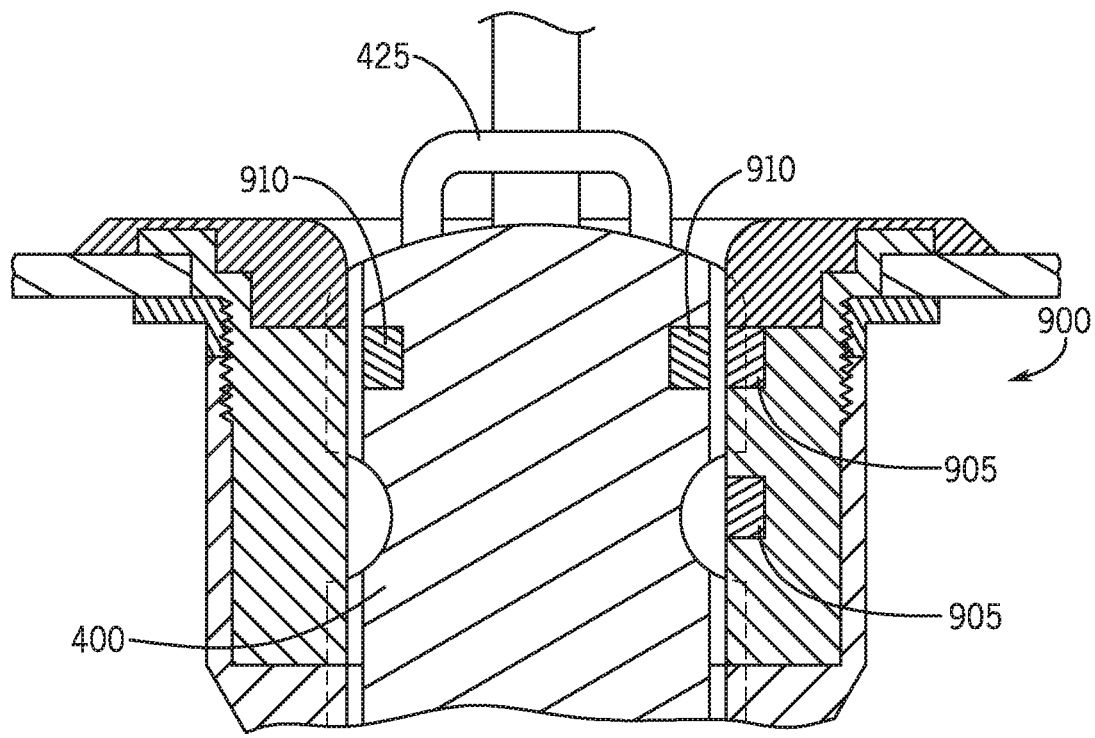
FIG. 16 is a cross-sectional view of the locking system of FIG. 14 including the magnets in an engaged position with respect to a cord management weight.

Referring now to FIGS. 13-14, another embodiment of a locking system 800 is shown. Specifically, FIGS. 13-14 depict views of a locking system 800 for the cord management system 300 including a pin 820 which is biased by a spring, according to an exemplary embodiment. The locking system 800 may include two or more joints 805. The joints 805 may be connected to and between a segment 810 which is rotatable within the locking system 500. The first joint 805a may be coupled to a tab 815. The tab 815 may be located at or near the top of the conduit 305, as shown (though anywhere may be applicable in some embodiments, so long as a user may access the tab 815). The tab 815 may be slidable (e.g., located within a channel 820). The second joint 805b may be coupled to a pin 820 (similar to pin 515 of FIG. 5A-5C). When the user slides the tab 815 towards the conduit 305 (as shown), the segment 810 may rotate about an axis "B" (as shown). The joints 805a and 805b may correspondingly rotate with the segment 810, and the pin 820 may retract form engagement with the detent 505.

In some embodiments, the locking system 800 may include a spring 825 which biases the pin 820 in a particular position (e.g., in a normally locked position where the pin 820 engages with the detent 505). The spring 825 may be located near the second joint 805b to push the second joint 805b towards the interior channel of the conduit 305, as shown. In some embodiments, the spring 825 may be located near the first joint 805a to push the first joint 805a away from the interior channel of the conduit 305. In each of these embodiments, the spring charged pin 800 may include one or more springs 925 to bias the pin 820 to a particular position. The user may slide the tab 815 towards and away from the conduit 305 with a force that overcomes the spring force which biases the pin 820 to thereby disengage the pin 820 from the detent 505. The user may then remove (or insert) the cord management weight 400 from (or into) the conduit 305.

Referring now to FIGS. 13-14, another embodiment of a locking system 900 is shown. Specifically, FIGS. 13-14 depict views of a locking system 900 for the cord management system 300 including a pin one or more magnets 905, according to an exemplary embodiment. Referring now to FIG. 9, in some embodiments, the locking system 900 may include one or more magnets 905 (or magnetic material). For instance, the key mechanism 530 may include one or more magnets 905, and the cord management weight 400 may include one or more magnets 910 (or magnetic material, such as a metal that interacts with a magnetic field to produce an attractive magnetic force). The cord management weight 400 may include the magnet(s) 910 (or magnetic material) on an outer surface of the cord management weight 400. In some embodiments, the magnet(s) 910 (or magnetic material) may be arranged along a diameter of the cord management weight 400 as shown. The magnetic material or magnets 910 included on the cord management weight 400 may act as a locking portion of the cord management weight 400 to inhibit translational movement of the cord management weight 400 within the conduit 305.

In some embodiments, the locking system 900 may include a plurality of magnets or magnetic material 905 on the conduit-side 305. For instance, the locking system 500 may include two magnets 905 on the conduit-side 305, though the conduit 305 may include any number of magnets 905. The magnets 905 may be positioned or situated at various locations within the wall of the conduit 305 such that the cord management weight 400 may be stopped at various locations within the conduit 305.

The magnetic material or magnets 910 on the cord management weight 400 may interact with the magnets 905 in or near the conduit 305 to provide a magnetic lock. For instance, opposite poles of magnets 905 and 910 may face one another to provide a magnetic attractive force. As the cord management weight 400 slides within the conduit 305, the magnetic material/magnets 910 on the surface of the cord management weight 400 may interact with the magnets 905 and thereby lock the position of the cord management weight 400 within the conduit 305. The user may then push (or pull) the cord management weight 400 with sufficient force to overcome the magnetic field strength (and resulting locking force) caused by the interaction of the magnetic material/magnets 910 on the cord management weight 400 and magnets 905 on the conduit-side.

Figure 17:
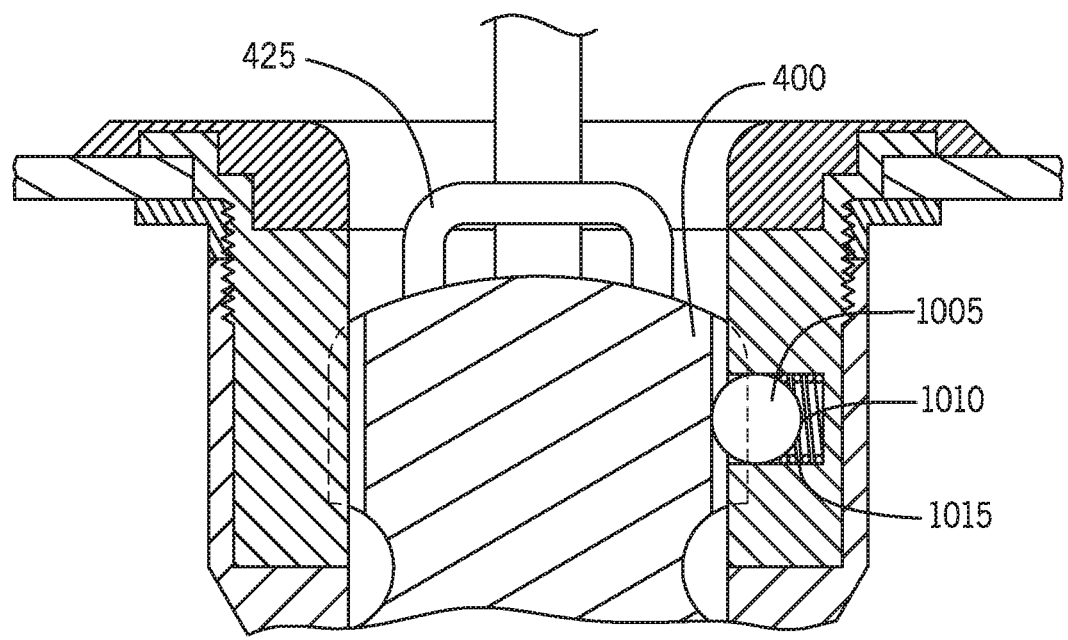
FIG. 17 is a cross-sectional view of a locking system for the cord management system of FIG. 4 including a spring-loaded ball in a disengaged position with respect to a cord management weight.
Figure 18:
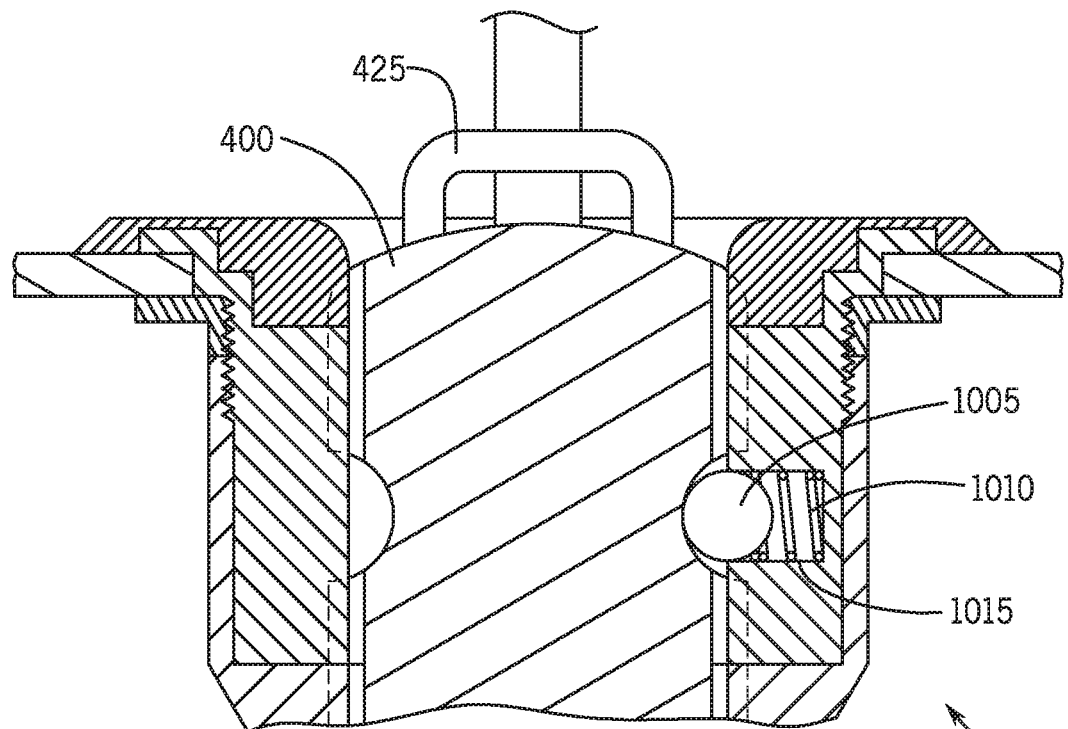
FIG. 18 is a cross-sectional view of the locking system of FIG. 17 including the spring loaded ball in an engaged position with respect to a cord management weight.

Referring now to FIGS. 17-18, another embodiment of a locking system 1000 is shown. Specifically, FIGS. 17-18 depict views of a locking system 1000 for the cord management system 300 including a spring-loaded ball 1005, according to an exemplary embodiment. The spring-loaded ball 1005 may be sized to engage the detent 505. The spring-loaded ball 1005 may include one or more springs 1010 which cause the spring-loaded ball 1005 to extend into the conduit 305. The spring(s) 1010 may be in a normally unloaded position such that the spring(s) 1010 cause the spring-loaded ball 1005 to extend into (and thus engage) the detent 505. In operation, the spring(s) 1010 may cause the spring-loaded ball 1005 to engage the detent 505 on the cord management weight 400 as the cord management weight 400 passes over the spring-loaded ball 1005 which is housed in a channel 1015 adjacent (and perpendicular to) the interior passage of the conduit 305. The spring-loaded ball 1005 may temporarily prevent further translational movement of the cord management weight 400 within the conduit 305.

As described above, the cord management weight 400 may be beveled near the transition between the detent 505 and the remaining body of the cord management weight 400 (e.g., above the neck formed by the detent 505). The bevel may cause a downward component to a normal force applied to the spring-loaded ball 1005 as the user pulls the cord management weight 400. The user may push (or pull) the cord management weight 400 to cause the detent 505 to exert an outward normal force on the spring-loaded ball 1005 to overcome the spring force of the spring(s) 1010. The spring-loaded ball 1005 may be pushed into a housing 1015 (which houses the spring(s) 1010 and is sized to house the spring-loaded ball 1005). The user may then remove (or insert) the cord management weight 400 from (or into) the conduit 305.

Figure 19:
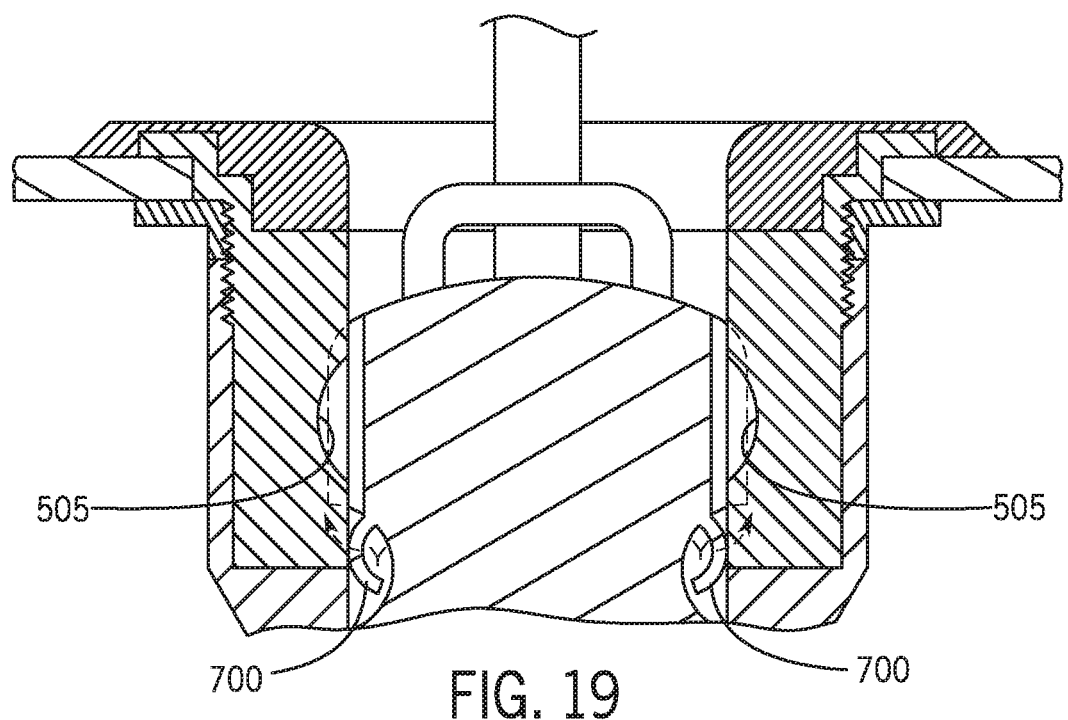
FIG. 19-FIG. 20 are cross-sectional views of the locking system of FIGS. 11-12, respectively, with components on the cord management weight interchanged with components on the conduit.
Figure 20:
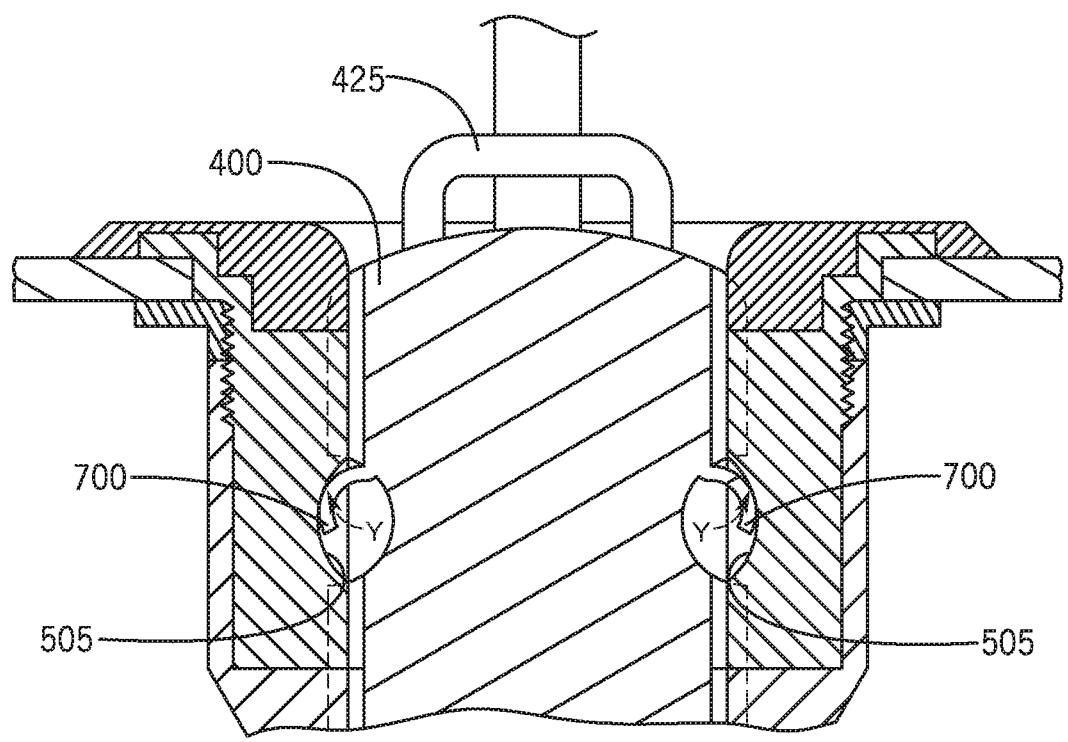

In some embodiments, the various arrangements shown in the locking systems 500-1000 described above may be reversed. For instance, in the embodiment shown in FIGS. 19-20, the locking system 700 depicted and described with reference to FIGS. 11-12 is reversed. Specifically, the flex lock 705 is positioned on or incorporated into the cord management weight 400. In this embodiment, the detent 505 is incorporated into the interior channel of the conduit 305. The flex lock 705 may be configured to flex outwardly along the arrows Y (e.g., towards the interior surface of the conduit 305) as force is provided along the arrows Y. While the embodiment in FIG. 7A-FIG. 7B is reversed, the embodiments depicted in, for instance, FIG. 5A-FIG. 6B and FIG. 8A-FIG. 10B may also be reversed. Thus, the components incorporated into the cord management weight 400 and arranged along the interior channel of the conduit 305 may be reversed.

Figure 21:
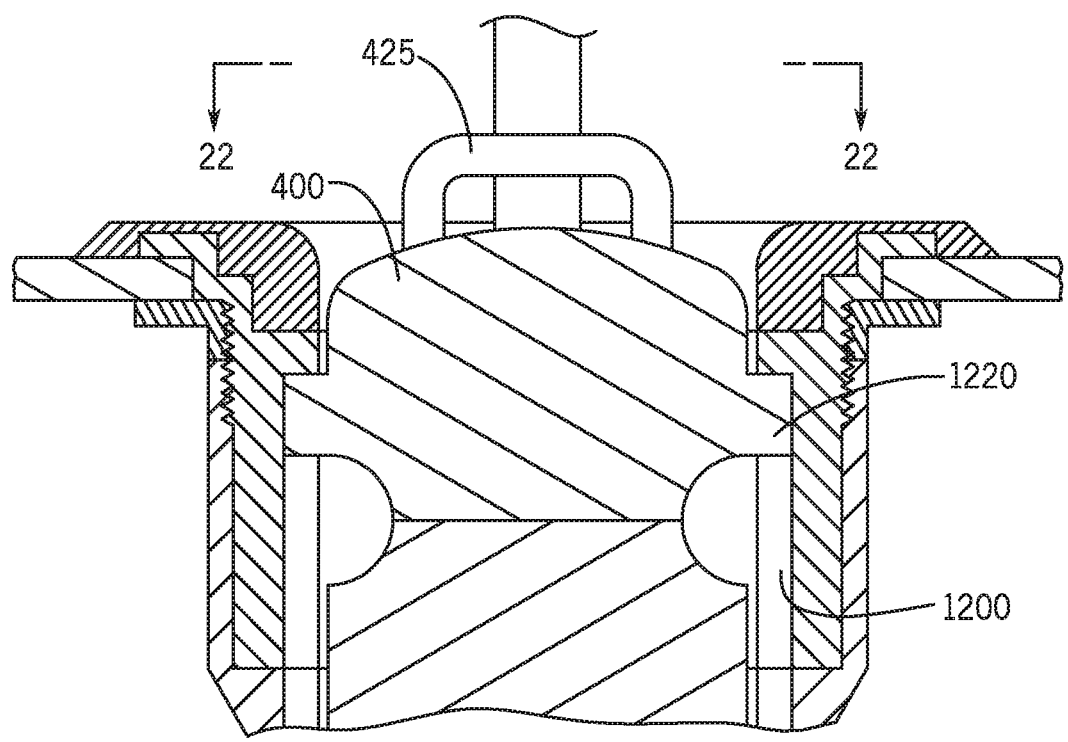
FIG. 21 depicts a cross-sectional view of a cord management weight of the cord management system of FIG. 4 including flanges for engaging a track within a conduit of the cord management system.
Figure 22:
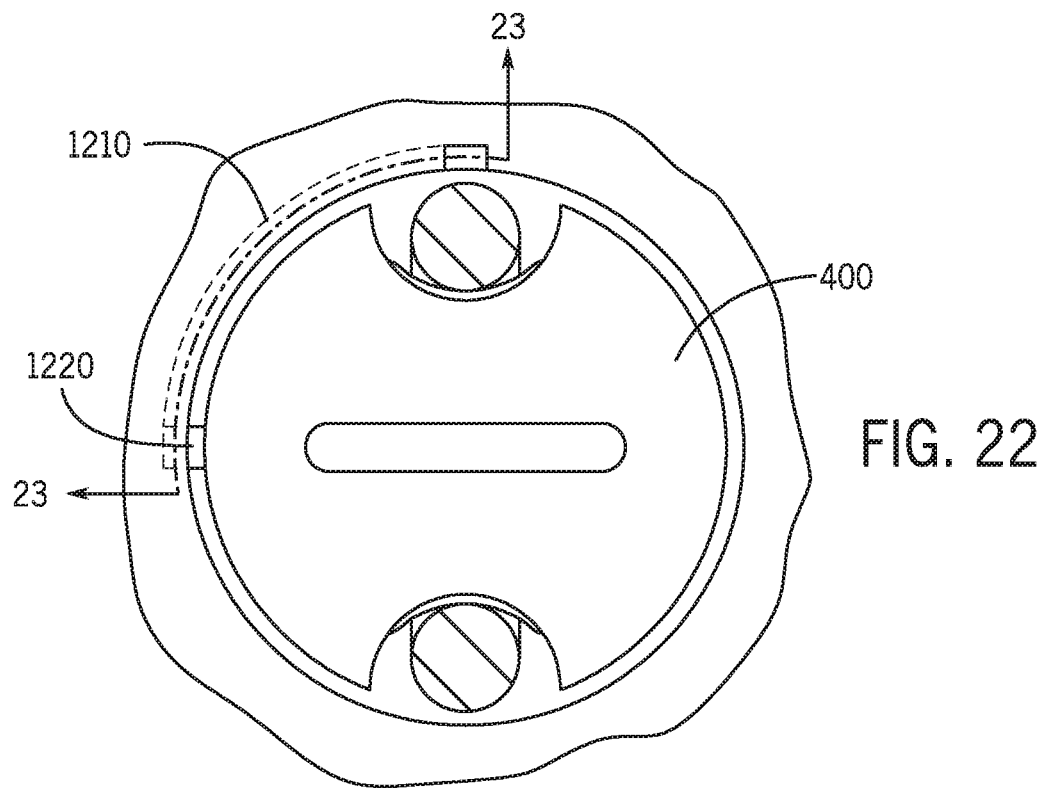
FIG. 22-FIG. 23 are views of the track of FIG. 21.
Figure 23:
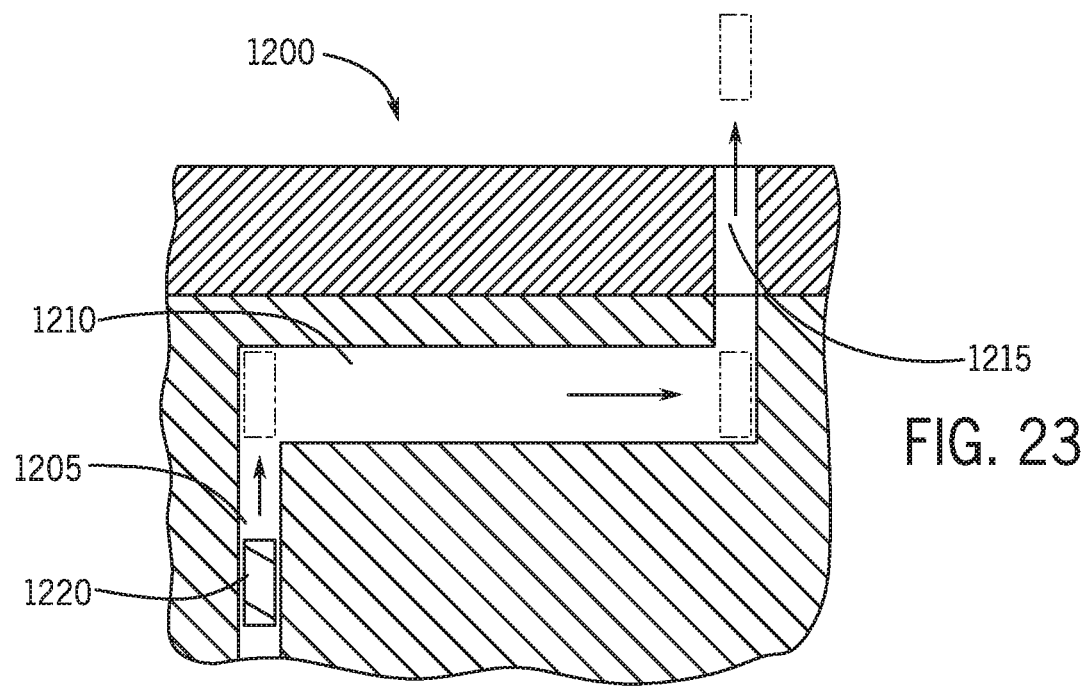
Figure 24:
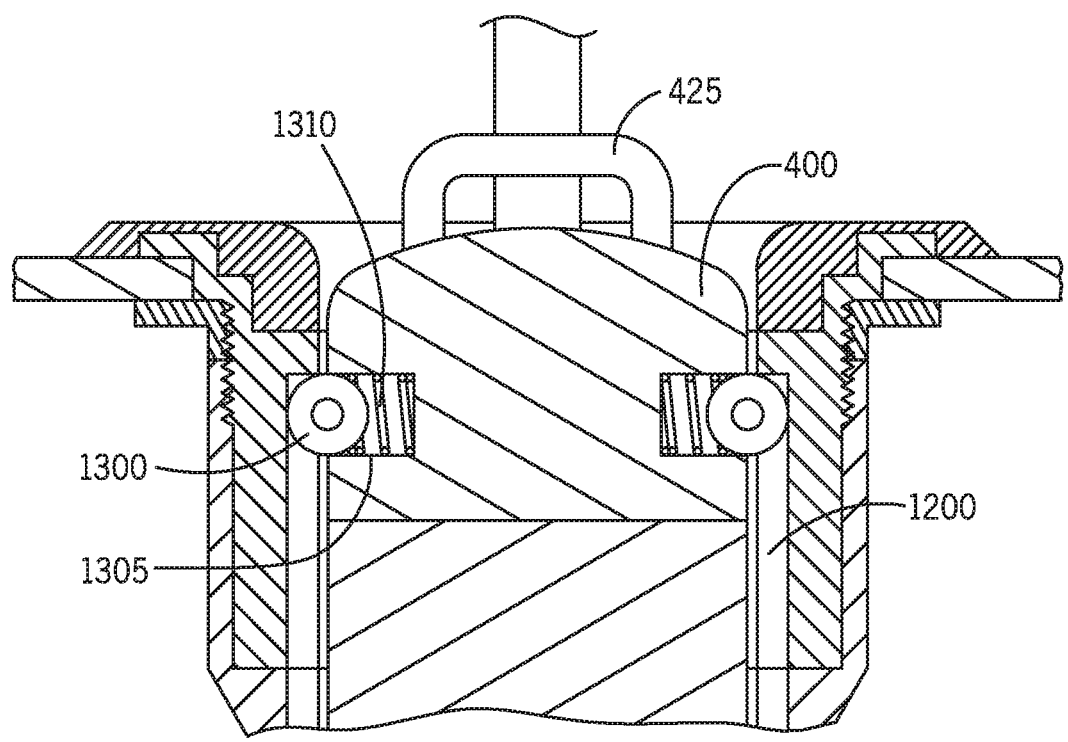
FIG. 24 is a cross-sectional view of the cord management weight of FIG. 21 including spring-loaded wheels for engaging the track.

Referring now to FIG. 21-FIG. 24, several embodiments of the cord management system 300 are shown. Specifically, FIG. 21 depicts a cross-sectional view of the cord management weight 400 including flanges 1220 for engaging a track 1200. FIG. 22-FIG. 23 depict views of the track 1200. FIG. 24 depicts a cross-sectional view of the cord management weight 400 including spring-loaded wheels 1300 for engaging the track 1200. The track 1200 may extend within the interior channel along the length of the conduit 305. The track 1200 may extend substantially vertically for substantially all of the length of the conduit 305. The track 1200 may also extend at an angle from the vertical portion of the track 1200. In this regard, the track 1200 may include a first vertically extending portion 1205, an angled portion 1210, and a second vertically extending portion 1215. The angled portion 1210 may form a 90° angle with the horizontally extending portions 1205, 1215 (e.g., the angled portion 1210 may be a horizontally extending portion 1210). In some embodiments, the angled portion 1210 may wrap around a sector of the perimeter of the conduit 305. For instance, the angled portion 1210 may wrap around a quarter of the perimeter of the conduit 305.

In some embodiments, the cord management system 300 may include two or more tracks 1200. In other embodiments, the cord management system 300 may include a single track 1200. The cord management weight 400 may include one or more flanges 1220. While shown as flanges 1220 in FIG. 21, in some embodiments, the cord management weight 400 may include spring-loaded wheels 1300 which are biased outwardly from a channel 1305 by a spring 1310, as shown in FIG. 24. The flanges 1220/spring-loaded wheels 1300 may be sized to fit within the track(s) 1200.

The user may pull or let out the cord 215 to raise or lower the cord management weight 400 within the conduit 305. The flanges 1220/spring-loaded wheels 1300 of the cord management weight 400 may move along the track(s) 1500 within the conduit 305. When the cord management weight 400 reaches the angled portion 1510, the user may rotate the cord management weight 400 within the conduit 305 to move the flanges 1220/spring-loaded wheels 1300 along the angled portion 1510 between the first vertical portion 1505 and second vertical portion 1515. The angled portion 1510 may interface with the flanges 1220/spring-loaded wheels 1300 to prevent further vertical movement of the cord management weight 400 within the conduit 305. Thus, the flanges 1220/spring-loaded wheels 1300 may act as a locking portion which selectively prevents translational movement of the cord management weight 400 and electrical cord 215 within the conduit 305. The user may rotate the cord management weight 400 to move the flanges 1220/spring-loaded wheels 1300 from the first vertically extending portion 1505, along the angled portion 1510, and to the second vertically extending portion 1515.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, mean the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that, when used to connect a list of elements, the term "or" means one, some, or all of the elements in the list. Conjunctive language such as the phrase "at least one of X, Y, and Z," unless specifically stated otherwise, is understood to convey that an element may be X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the cord management system as shown in the various exemplary embodiments is illustrative only. Additionally, any element disclosed in one embodiment may be incorporated or utilized with any other embodiment disclosed herein. For example, the tracks of the exemplary embodiment described in at least paragraph(s) [0070]-[0072] may be incorporated in the exemplary embodiments described with reference to FIGS. 7-20 to provide additional locking mechanisms to prevent or inhibit inadvertent removal. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A cord management system comprising:
   a storage rack of a cabinet;
   a receptacle within the storage rack and extending below an upper surface of the storage rack, the receptacle sized to support an electronic device;
   a conduit coupled to the storage rack of the cabinet and extending below the upper surface of the storage rack, the conduit having a plurality of flexible conduit locking features disposed at different locations along the length of the conduit and configured to extend into the conduit when no force is applied to the flexible locking features, wherein an electrical outlet configured to supply power to the electronic device is supported by the cabinet;
   a cord management weight disposed within the conduit, the cord management weight having a cord receiving portion and a detent on the exterior surface, the cord receiving portion configured to receive a portion of an electrical cord of the electronic device, and the weight detent configured to selectively receive one of the plurality of flexible conduit locking features of the conduit, preventing translational movement of the cord management weight within the conduit, wherein the cord management weight is configured to be selectively retracted into the conduit and locked into position within the conduit,
   wherein the plurality of flexible locking features are configured to flex permitting passage of the cord management weight in response to an upward or a downward force applied to the cord management weight.

2. The cord management system of claim 1, wherein the detent locks the position of the cord management weight in one of a plurality of locations within the conduit.

3. The cord management system of claim 1, wherein the flexible conduit locking features comprise a flex ring configured to flex into the detent to prevent translational movement of the cord management weight relative to the conduit.

4. A cabinet comprising:
   a rack, supported by a side wall of the cabinet;
   a receptacle within the rack and extending below an upper surface of the rack, the receptacle configured to support an electronic device;
   an electrical outlet, supported by the side wall of the cabinet, configured to provide electrical power to the electronic device;
   a conduit having an opening at an end of the conduit nearest to the electrical outlet, the conduit extending below the upper surface of the rack and having a plurality of flexible conduit locking features disposed at different locations along the length of the conduit and configured to extend into the conduit when no force is applied to the flexible locking features;
   a cord management weight disposed within the conduit, the cord management weight having a cord receiving portion configured to receive a portion of an electrical cord of the electronic device, and a detent on the exterior surface configured to selectively receive one of the plurality of flexible conduit locking features, preventing translational movement of the cord management weight within the conduit, wherein the electrical cord may be selectively retracted into the conduit via the cord management weight,
   wherein the plurality of flexible locking features are configured to flex permitting passage of the cord management weight in response to an upward or a downward force applied to the cord management weight.

5. The cord management system of claim 1, wherein the weight detent is configured to selectively prevent translational movement of the cord management weight at a plurality of locations within the conduit.

6. The cord management system of claim 1, wherein the conduit comprises a first end having an exposed opening and a second end that is closed.

7. The cord management system of claim 1, wherein the flexible conduit locking features comprise a flex lock configured to flex into the detent to prevent translational movement of the cord management weight relative to the conduit.

8. The cord management system of claim 4, wherein the flexible conduit locking features comprise a flex ring configured to flex into the detent to prevent translational movement of the cord management weight relative to the conduit.

9. The cabinet of claim 4, further comprising a cabinet housing, wherein the conduit is self-contained within the cabinet housing.

10. The cabinet of claim 4, wherein the electrical outlet is configured to receive electrical power from a power supply external to the cabinet.

11. The cabinet of claim 4, wherein the end is a first end, and the conduit further comprises a second closed end opposite the first end.

12. The cord management system of claim 4, wherein the flexible conduit locking features comprise a flex lock configured to flex into the detent to prevent translational movement of the cord management weight relative to the conduit.

13. A locking system for a cord management weight, the locking system comprising:

a plurality of flexible conduit locking features operatively coupled to a conduit that is sized to receive a cord management weight, the conduit coupled to a rack of a cabinet, the rack configured to support an electronic device, wherein an electrical outlet configured to supply power to the electronic device is supported by the cabinet;

at least three predetermined locking positions within the conduit;

a weight locking feature comprising a detent operatively coupled to the cord management weight, wherein the weight locking feature is configured to operatively receive the flexible conduit locking features as the cord management weight moves within the conduit, the cord management weight being selectively locked into one of the at least three predetermined locking positions within the conduit when the conduit locking features are operatively coupled to the weight locking feature, wherein the flexible conduit locking features are configured to flex permitting passage of the cord management weight in response to an upward or a downward force applied to the cord management weight.

14. The locking system of claim 13, wherein the flexible conduit locking features comprise a flex ring configured to flex into the detent to prevent translational movement of the cord management weight relative to the conduit.

15. The locking system of claim 13, wherein the flexible conduit locking features comprise a flex lock configured to flex into the detent to prevent translational movement of the cord management weight relative to the conduit.

* * * * *